US006826588B2

(12) United States Patent
Bhushan et al.

(10) Patent No.: US 6,826,588 B2
(45) Date of Patent: Nov. 30, 2004

(54) METHOD AND APPARATUS FOR A FAST COMPARISON IN REDUNDANT FORM ARITHMETIC

(75) Inventors: Bharat Bhushan, Cupertino, CA (US); Edward Grochowski, San Jose, CA (US); Vinod Sharma, Sunnyvale, CA (US); John Crawford, Saratoga, CA (US)

(73) Assignee: Intel Corporation, Santa Clara, CA (US)

( * ) Notice: Subject to any disclaimer, the term of this patent is extended or adjusted under 35 U.S.C. 154(b) by 344 days.

(21) Appl. No.: 10/032,026

(22) Filed: Dec. 17, 2001

(65) Prior Publication Data

US 2002/0147755 A1 Oct. 10, 2002

Related U.S. Application Data

(63) Continuation-in-part of application No. 09/746,771, filed on Dec. 22, 2000.
(60) Provisional application No. 60/171,872, filed on Dec. 23, 1999.

(51) Int. Cl.$^7$ ................................................ G06F 7/02
(52) U.S. Cl. ...................................................... 708/671
(58) Field of Search ................................. 708/671, 670, 708/708

(56) References Cited

U.S. PATENT DOCUMENTS

| 3,935,438 | A | 1/1976 | Grupe | 235/174 |
|---|---|---|---|---|
| 4,422,143 | A | 12/1983 | Guttag | 364/200 |
| 4,569,032 | A | 2/1986 | Lee | |
| 4,709,226 | A | 11/1987 | Christopher | 340/347 DD |
| 4,858,168 | A | 8/1989 | Hwang | |

(List continued on next page.)

OTHER PUBLICATIONS

PCT International Search Report, Application No. PCT/US 00/42165, date of completion of the search, Jul. 3, 2001.
Cortadella J. et al.: "Evaluation of A+B =K Conditions Without Carry Propogation" IEEE Transactions on Computers, vol. 41, No. 11, Nov. 1992.
Parhami, B.: "Comments on Evaluation of A+B =K Conditions Without Carry Propogation" IEEE Transactions on Computers, vol. 43, No. 4, Apr. 1994.
Duprat J. et al.: "Ecrire les nombres autrement pour calculer plus vite" Technique et Science Informatiques, vol. 10, No. 3, 1991.
Parhami, B.: "On the Implementation of Arithmetic Support Functions for Generalized Sign–Digit Number Systems" IEEE Transactions on Computers, vol. 42, No. 3, Mar. 1993.
Lutz, D. et al.: "Early Zero Detection", International Conference on Computer Design, pp. 545–550, 1996.
Lutz, D. et al.: "The Half–Adder Form and Early Branch Condition Resdolution" Arithmetic 13, pp. 266–273, 1997.

(List continued on next page.)

Primary Examiner—D. H. Malzahn
(74) Attorney, Agent, or Firm—Larry M. Mennemeier

(57) ABSTRACT

The present invention provides an efficient method for bypassing outputs while in redundant form to an arithmetic circuit that is capable of adding or subtracting numbers in redundant from and comparing the magnitudes of numbers received in redundant form for equality and inequality relationships. For one embodiment of the invention, an arithmetic circuit subtracts numbers received in redundant form and compares the result to zero represented in redundant form without carry propagation. In parallel with the subtraction and comparison, the most significant bits of each number received in redundant form are generated and compared for equality, and a carry-out is generated for the subtraction. These results are combined by magnitude comparison logic to produce a magnitude comparison for the numbers received in redundant form.

31 Claims, 37 Drawing Sheets

U.S. PATENT DOCUMENTS

| | | | | |
|---|---|---|---|---|
| 4,878,192 | A | * 10/1989 | Nishiyama et al. | 708/670 |
| 4,890,127 | A | 12/1989 | Darley | 364/786 |
| 4,899,305 | A | 2/1990 | Needles | |
| 4,967,388 | A | 10/1990 | Tate | 364/760 |
| 4,972,362 | A | 11/1990 | Elkind et al. | 364/760 |
| 5,115,408 | A | 5/1992 | Darley et al. | 364/754 |
| 5,140,546 | A | 8/1992 | Ishikawa et al. | |
| 5,144,577 | A | 9/1992 | Linnenberg | 364/769 |
| 5,206,825 | A | 4/1993 | Takagi et al. | 364/746.2 |
| 5,208,490 | A | 5/1993 | Yetter | |
| 5,270,962 | A | 12/1993 | Fettweis | 364/766 |
| 5,285,406 | A | 2/1994 | Lynch et al. | |
| 5,329,477 | A | 7/1994 | Kudou | |
| 5,341,322 | A | 8/1994 | Fettweis et al. | 364/764 |
| 5,386,377 | A | 1/1995 | McClure | 364/787 |
| 5,392,423 | A | 2/1995 | Yetter | |
| 5,418,736 | A | 5/1995 | Widigen et al. | 364/786 |
| 5,581,497 | A | 12/1996 | Kumar | |
| 5,659,495 | A | 8/1997 | Briggs et al. | 364/736.02 |
| 5,680,339 | A | 10/1997 | Moyse et al. | 364/745 |
| 5,696,954 | A | 12/1997 | Guttag et al. | 395/562 |
| 5,719,803 | A | 2/1998 | Naffziger | |
| 5,754,819 | A | 5/1998 | Lynch et al. | 395/421.08 |
| 5,764,550 | A | 6/1998 | D'Souza | 364/716.04 |
| 5,808,928 | A | 9/1998 | Miyoshi | 364/760.01 |
| 5,815,420 | A | 9/1998 | Steiss | 364/736.04 |
| 5,923,579 | A | 7/1999 | Widigen et al. | 364/786.01 |
| 6,192,387 | B1 | * 2/2001 | Taddiken et al. | 708/493 |
| 6,466,960 | B1 | * 10/2002 | Winters | 708/671 |
| 6,629,118 | B1 | * 9/2003 | Hutchison et al. | 708/525 |

OTHER PUBLICATIONS

Lutz, D. et al.: "Comparison of two's complement numbers" Int. J. Electronics, vol. 80, No. 4, pp. 513–523, 1996.

Lutz, D. et al.: "Programmable Modulo–K Counters" IEEE Transactions on Circuits and Systems—I: Fundamental Theory and Applications, vol. 43, No. 11, Nov. 1996.

Obaidat M. S. et al.: "Fast multi–step addition algorithm" Int. J. Electronics, vol. 70, No. 5, pp. 839–849, 1991.

Ling, H., "High–Speed Binary Adder", IBM Journal of Research and Development, vol. 25, No. 2–3, pp. 156–166, May–Jun. 1981.

Dobberpuhl, D.W., et al., "A 200–Mhz 64b Dual–Issue CMOS Microprocessor," IEEE Journal of Solid State Circuits, vol. 27, No. 11, Nov. 1992, pp. 1555–1567.

Inoue, A., et al., "A 0.4$\mu$ m 1.4ns 32b Dynamic Adder using Non–precharge Multiplexers and Reduced Precharge Voltage Technique," Symposium on VLSI Circuits Digest of Technical Papers, Jun. 1995, pp. 9–10.

Ling, H., "High–Speed Binary Parallel Adder," IEEE Transactions on Electronic Computers, vol. 15, Oct. 1966, pp. 799–802.

Naffziger, S., "A Sub–Nanosecond 0.5$\mu$m 64b Adder Design," ISSCC Digest of Technical Papers, 1996, pp. 362–363.

Quach, N. et al., "High Speed Addition in CMOS," Stanford University Technical Report: CSL–TR–90–415, Feb. 1990, 16 pgs.

Suzuki, M., et al., "A 1.5–ns 32–b CMOS ALU in Double Pass– Transistor Logic," IEEE Journal of Solid State Circuits, vol. 28, No. 11, Nov. 1993, pp. 1145–1151.

* cited by examiner

| Pair i | 0 +0 | 1 +1 | -1 +-1 | |
|---|---|---|---|---|
| Pair i-1 | any | any | any | |
| Output | $C_i = 0$ $U_i = 0$ | $C_i = 1$ $U_i = 0$ | $C_i = -1$ $U_i = 0$ | |

| Pair i | 0 +1 | -1 +0 | -1 +0 | 0 +1 |
|---|---|---|---|---|
| Pair i-1 | no -1 | no -1 | has -1 | has -1 |
| Output | $C_i = 1$ $U_i = -1$ | $C_i = 0$ $U_i = -1$ | $C_i = -1$ $U_i = 1$ | $C_i = 0$ $U_i = 1$ |

Rules for adding sign-digit numbers:
$Sum_i = C_{i-1} + U_i$

| 3:2 Compressor | | | | |
|---|---|---|---|---|
| ROM Address | | | ROM Data | |
| 0 | 0 | 0 | 0 | 0 |
| 0 | 0 | 1 | 0 | 1 |
| 0 | 1 | 0 | 0 | 1 |
| 0 | 1 | 1 | 1 | 0 |
| 1 | 0 | 0 | 0 | 1 |
| 1 | 0 | 1 | 1 | 0 |
| 1 | 1 | 0 | 1 | 0 |
| 1 | 1 | 1 | 1 | 1 |
| A B C | | | Carry Sum | |

|     | $C_2S_2$ | $C_1S_1$ | $C_0S_0$ |
|-----|----|----|----|
| 910 | 00 | 00 | 00 |
| 911 | 01 | 01 | 10 |
| 912 | 01 | 10 | 00 |
| 913 | 00 | 11 | 10 |
| 914 | 10 | 00 | 00 |
| 915 | 11 | 01 | 10 |
| 916 | 11 | 10 | 00 |
| 917 | 10 | 11 | 10 |

FIG. 9a

|     | $C_2S_2$ | $C_1S_1$ | $C_0S_0$ |
|-----|----|----|----|
| 920 | 11 | 11 | 11 |
| 921 | 10 | 10 | 01 |
| 922 | 10 | 01 | 11 |
| 923 | 11 | 00 | 01 |
| 924 | 01 | 11 | 11 |
| 925 | 00 | 10 | 01 |
| 926 | 00 | 01 | 11 |
| 927 | 01 | 00 | 01 |

FIG. 9b

|      | $C_2S_2$ | $C_1S_1$ | $C_0S_0$ |   | $\overline{C_2S_2}$ | $\overline{C_1S_1}$ | $\overline{C_0S_0}$ |       |
|------|----|----|----|---|----|----|----|-----|
| 3 =  | 00 | 01 | 01 | → | 11 | 10 | 10 | = 2 |
| 2 =  | 00 | 01 | 00 | → | 11 | 10 | 11 | = 3 |
| 1 =  | 00 | 00 | 01 | → | 11 | 11 | 10 | = -4 |
| 0 =  | 00 | 00 | 00 | → | 11 | 11 | 11 | = -3 |
| -1 = | 01 | 01 | 01 | → | 10 | 10 | 10 | = -2 |
| -2 = | 01 | 01 | 00 | → | 10 | 10 | 11 | = -1 |
| -3 = | 01 | 00 | 01 | → | 10 | 11 | 10 | = 0 |
| -4 = | 01 | 00 | 00 | → | 10 | 11 | 11 | = 1 |

$$N \rightarrow \overline{N} = -N - 3 \pmod{8}$$

FIG. 10

| $C_2S_2$ | $C_1S_1$ | $C_0S_0$ | $(S_2 \oplus C_1) \oplus (S_1 + C_0)$ | | | | | | |
|---|---|---|---|---|---|---|---|---|---|
| 00 | 00 | 00 | 0 | 0 | 0 | 0 | 0 | 0 | 0 |
| 01 | 01 | 10 | 1 | 1 | 0 | 0 | 1 | 1 | 1 |
| 01 | 10 | 00 | 1 | 0 | 1 | 0 | 0 | 0 | 0 |
| 00 | 11 | 10 | 0 | 0 | 1 | 0 | 1 | 1 | 1 |
| 10 | 00 | 00 | 0 | 0 | 0 | 0 | 0 | 0 | 0 |
| 11 | 01 | 10 | 1 | 1 | 0 | 0 | 1 | 1 | 1 |
| 11 | 10 | 00 | 1 | 0 | 1 | 0 | 0 | 0 | 0 |
| 10 | 11 | 10 | 0 | 1 | 1 | 0 | 1 | 1 | 1 |

2200
2201
2202
2203
2204
2205
2206
2207

METHOD AND APPARATUS FOR A FAST COMPARISON IN REDUNDANT FORM ARITHMETIC

CROSS-REFERENCES TO RELATED APPLICATIONS

This is a continuation-in-part of application Ser. No. 09/746,771, filed on Dec. 22, 2000, which is a currently pending non-provisional application, claiming the benefit of provisional application Ser. No. 60/171,872, filed on Dec. 23, 1999.

FIELD OF THE INVENTION

The present invention relates to the field of computer operations on numbers in binary form, including addition, subtraction and comparisons. In particular, it relates to these operations when numbers are represented in redundant form.

BACKGROUND OF THE INVENTION

In digital computations, the representation of numbers has a significant bearing upon the design of digital arithmetic circuits and therefore, upon their performance and complexity. Integer operands are represented in binary forms by ones and zeros in a base 2 number system. Three commonly used representation methods are called: sign-magnitude, one's complement, and two's complement.

FIG. 1a shows numbers represented in sign-magnitude. In sign-magnitude numbers, the most significant bit represents the sign (positive or negative) of the number. A sign-magnitude number can be negated by complementing the number's sign bit. When adding two positive or two negative numbers, the operation is straightforward. But, when the signs of the operands are different, the number with the smaller magnitude should be subtracted from the number with the larger magnitude. This makes arithmetic operations on sign-magnitude numbers cumbersome. The circuit for performing arithmetic operations must include an adder circuit, a subtracter circuit and a comparator circuit. Because of the complexity, and because of a serial dependency upon a comparison to control the arithmetic circuitry, designers have proposed other representation methods.

FIG. 1b shows numbers represented in one's complement. One way of determining the representation of a negative number in one's complement is to subtract the magnitude of the number from $2^n-1$ where n is the number of digits used in the representation. For example, if the word length is 4 bits, then $2^4-1=15$ is used, and the ones complement representation of $-7$ is calculated as shown in 120 of FIG. 1b.

A simpler way of determining the representation of a negative number in ones complement is to complement each bit of the corresponding positive number. This observation is key to simplifying subtraction for ones complement numbers. Since negating a number, B, is easily accomplished by digital circuitry, subtracting is accomplished through a combination of addition and negation:

$$A-B=A+(-B)$$

Since there are two ways to represent zero in the ones complement representation method, addition circuitry is still slightly complicated.

FIG. 1c shows numbers represented in twos complement. In twos complement representation, there is only one representation for zero. The representation of a negative number can be determined by subtracting the magnitude of the number from $2^n$ where n is the number of digits used to represent the number. For example, to find the representation of $-7$ in twos compliment, $2^4=16$ is used, as in the calculation shown in 130 of FIG. 1c.

FIG. 2 shows a 4-bit adder/subtracter for numbers represented in twos complement. A benefit of twos complement is that it reduces the complexity of the adder circuit. A twos complement adder/subtracter can be simplified by implementing twos complement negation as ones complement negation followed by incrementation.

In an addition/subtraction operation, carry signals propagate from right to left (less significant to more significant) until they reach a final destination, which can include the leftmost digit of a result. The time it takes for carry signals to propagate is directly related to the time it takes for a digital arithmetic circuit to produce a result of an operation. The circuit of FIG. 2 is referred to as a ripple adder. In a ripple adder, a carry signal at stage i+1 is given as a function of the inputs at the ith stage.

FIG. 3a shows a carry-lookahead adder circuit, which uses a circuit shown in FIG. 3b to propagate the carry signal. These circuits directly produce carry propagate and carry generate signals at each stage. FIG. 3c shows a set of alternative circuits used to propagate the carry signal according to Ling's equations in an alternative carry-lookahead adder (Huey Ling, "High-Speed Binary Adder," *IBM J. Res. Develop.*, vol. 25, no. 3, May 1981).

The response time for a ripple adder with n stages is proportional to n, whereas the response time for a faster implementation such as a carry-lookahead adder is proportional to a logarithm of n.

In a system of numbers, where each number is assigned multiple binary representations, the numbers are said to be in redundant form. Further improvements in adder response times make use of numbers represented in redundant forms. For example, U.S. Pat. Nos. 4,890,127 and 5,815,420, use a signed-digit redundant representation form. Each digit is represented as a sign bit and a magnitude bit and can take on values of 1, 0, and $-1$.

FIG. 4 shows a circuit for calculating the sign bit and magnitude bit for each digit in the result, Z, from the digits of the operands, X and Y (as described in FIG. 2 in U.S. Pat. No. 4,890,127). Negation is simple but calculations are somewhat complicated due to sign comparisons, and some calculations can generate new carries, which must be allowed to propagate. FIG. 5 shows a set of rules to determine intermediate carries and sums, that avoids generating problematic new carries but introduces some additional computational complexity (from N. Takagi et al, "High speed VLSI multiplication algorithm with redundant binary addition tree," *IEEE Trans. On Computes*, 34 (September 1985) 789–796).

Current microprocessors make use of pipelining to reduce the cycle time and exploit parallelism within instruction streams. In order to make pipelining efficient, results from digital arithmetic circuitry are bypassed back to circuit inputs as operands for the next instruction in a pipeline. This technique is preferred over one of waiting until results are written back to a register file, and it provides for higher utilization of a pipeline's parallelism.

Conversion from a redundant representation form to twos complement requires the propagation of carry signals. When results of a first operation are immediately required to perform a second operation, a conversion reduces the benefits of performing digital arithmetic in redundant form.

In U.S. Pat. No. 5,923,579, Widegen et al have shown a three-input comparator, where one of the inputs is an implicit constant. FIG. 6 shows a preferred embodiment of the comparator device consisting of a custom carry-save adder (CSA) structure and a carry-propagate circuit (CPC). The custom CSA uses two different bit cells depending upon whether that bit position in the constant input is a one or a zero, and the CPC employs a full carry-lookahead circuit to provide the comparison result as quickly as possible.

BRIEF DESCRIPTION OF THE DRAWINGS

FIG. 9a shows all of the valid 3-digit representations using a redundant form with a carry bit and a sum bit for each binary digit of the number zero.

FIG. 9b shows all of the valid 3-digit representations using a redundant form with a carry bit and a sum bit for each binary digit of the number negative three.

FIG. 10 shows a mapping of numbers in a redundant representation having three digits that corresponds to complementation by bitwise negation.

FIG. 13a also shows two possible locations to tap results in redundant form for bypassing.

DETAILED DESCRIPTION

The present invention provides an efficient method for bypassing outputs while in redundant form to an arithmetic circuit that is capable of adding or subtracting numbers in redundant from and comparing the magnitudes of numbers received in redundant form. In general, these numbers received in redundant form may represent any value of a set of possible values. Typically the set contains $2^n$ distinct values corresponding to all possible n-bit representations. For example the set may be $[-2^{n-1}, 2^{n-1}-1]$ for a signed n-bit two's complement representation, or $[0, 2^n-1]$ for an unsigned n-bit representation. A value of the set may be represented by 2n or more bits in a redundant form.

For one embodiment of the invention, an arithmetic circuit subtracts numbers received in redundant form and compares the result to zero represented in redundant form without carry propagation. In parallel with the subtraction and comparison, the most significant bits of each number received in redundant form are generated and compared for equality, and a carry-out is generated for the subtraction. These results are combined by magnitude comparison logic to produce a magnitude comparison for the numbers received in redundant form.

Another embodiment of the invention is a process, which includes generating a complemented redundant form of an operand supplied in redundant form to an arithmetic circuit, and adjusting an input to the arithmetic circuit to augment a result. The result thus generated through the arithmetic circuit is a valid outcome in redundant form of a subtraction operation. A most significant bit is generated for each of the operands supplied in redundant form. Using fast carry logic, a carry-out signal is also generated for the subtraction operation. Using a non-propagative comparator, the outcome of the subtraction is compared to zero to generate an equality signal. Finally, magnitude comparison logic is used to generate a result of a magnitude comparison from the equality signal, the carry-out signal and the most significant bits of the operands.

Thus at very high computation rates, efficient bypassing of operands in redundant form can be accomplished for operations including addition, subtraction and magnitude comparisons.

One redundant form that is useful for implementing fast arithmetic circuits uses a carry bit, $C_A$, and a sum bit, $S_A$, for each digit of the binary representation of a number, A. As will be shown in more detail below, this particular redundant form representation permits numbers to be added together using a carry-save adder.

Figure 7A:
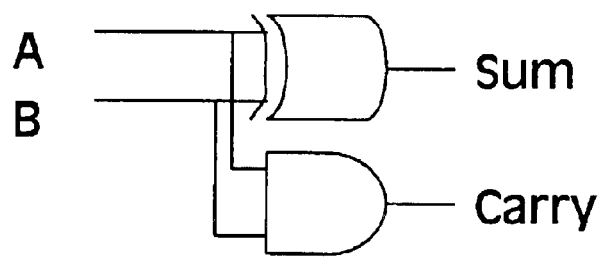
FIG. 7a shows a half adder circuit, which can be used as a building block to construct a full adder circuit.

The carry save adder has a structure very similar to that of a traditional adder except for eliminating the need to propagate carry signals along the length of the result. A carry save adder operates on numbers represented in a redundant form. Each digit position has a sum bit and a carry bit. When adding two of these numbers together, circuits similar to traditional half adders and 3:2 compressors can be used. FIG. 7a shows the traditional half adder, and FIG. 7b shows a 3:2 compressor circuit that can be used to form the basic building block of a carry save adder, according to one embodiment of the current invention.

Figure 7B:
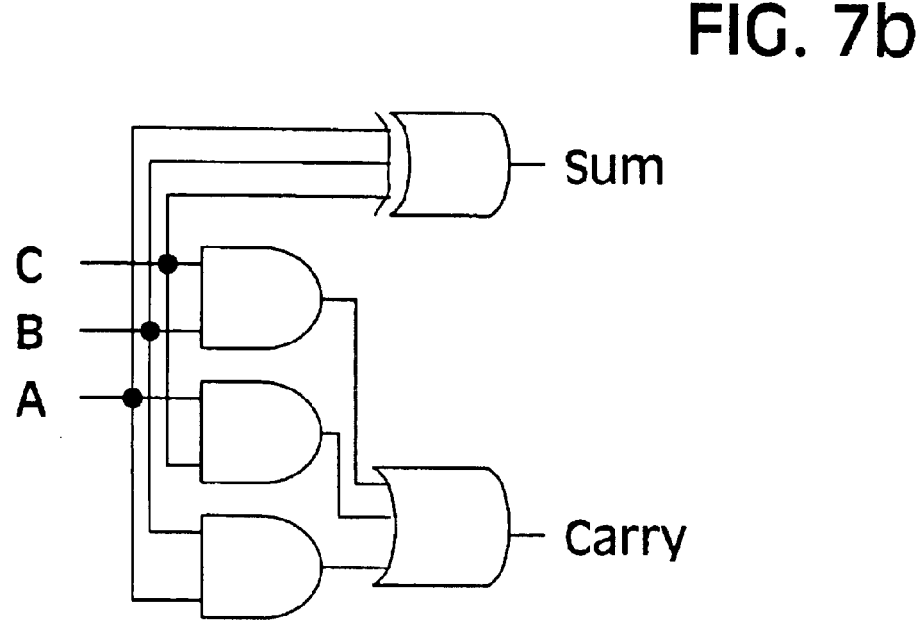
FIG. 7b shows a 3:2 compressor or counter that can be used to form the basic building block of a carry save adder.
Figures 7C, 8:
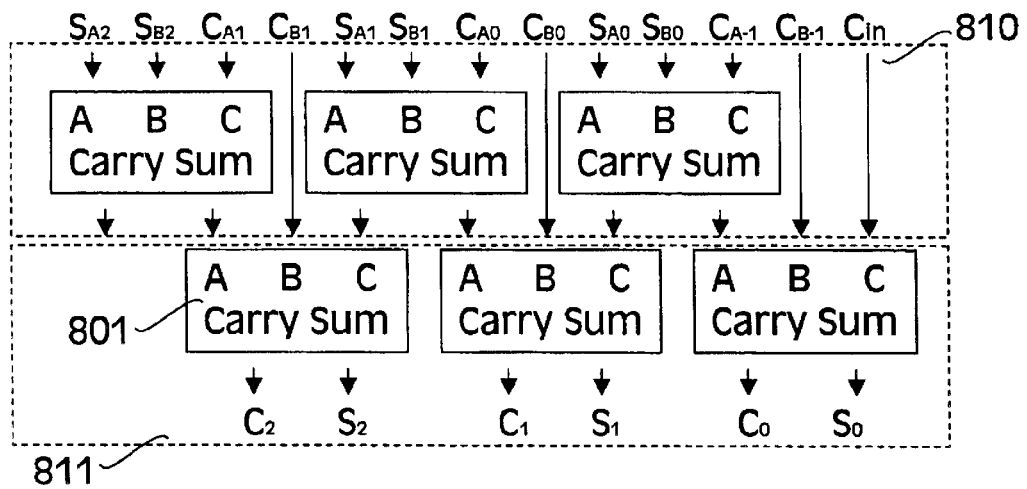
FIG. 7c shows another implementation out of numerous possible implementations of a compressor or counter device, this one using a read-only memory (ROM) circuit. Any of these numerous implementations can be used to construct a carry save adder.
FIG. 8 shows a carry save adder constructed from 3:2 compressor circuits with the same functionality as the circuits shown in FIG. 7b or FIG. 7c.

FIG. 7c shows another implementation out of numerous possible implementations of a compressor or counter device, this one using a read-only memory (ROM) circuit. When a ROM address is presented to the circuit, the ROM data corresponding to the address presented is output. Any of these numerous implementations can be used to construct a carry save adder.

FIG. 8 shows how a carry save adder can be constructed from the 3:2 compressor circuit of FIG. 7b, FIG. 7c or equivalent circuitry. If the B inputs were derived from a twos complement representation of −B, then the results produced by the digital arithmetic circuit of FIG. 8 will be one of the valid representation of A−B in a carry-sum redundant form. But if a redundant form representation of B needs to be negated, then a conversion to two's complement requires propagation of B's carry bits. The present invention provides that at least one valid carry-sum representation of −B can be produced from any valid representation of B in carry-sum redundant form.

Figure 1A:
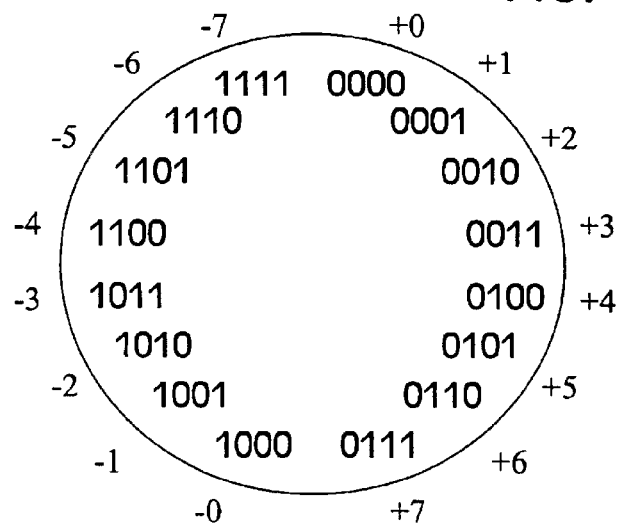
FIG. 1a shows 4-digit numbers represented in the sign-magnitude representation method.
Figure 1B:
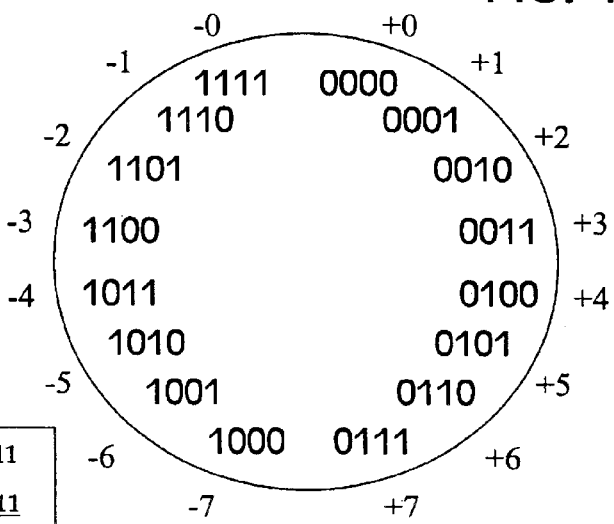
FIG. 1b shows 4-digit numbers represented in the one's complement representation method and an example of negation.
Figure 1C:
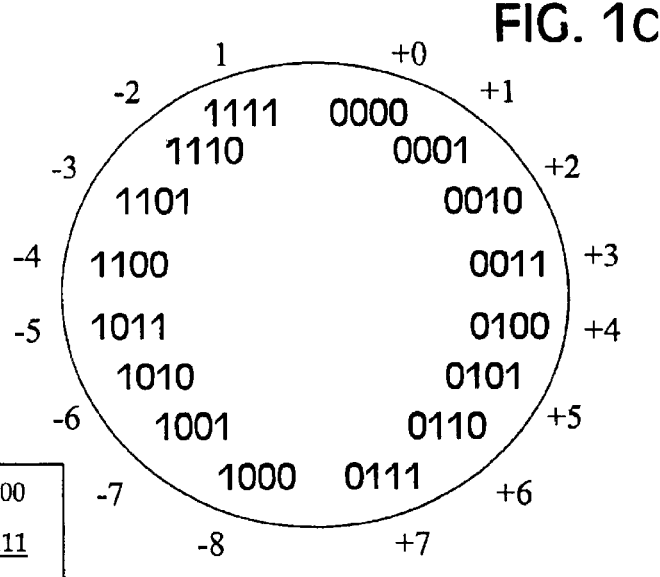
FIG. 1c shows 4-digit numbers represented in the two's complement representation method and an example of negation.
Figure 2:
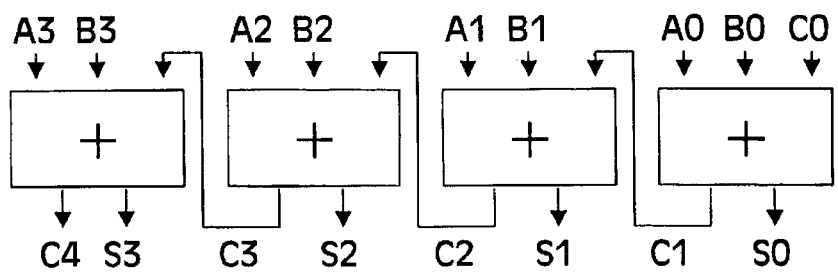
FIG. 2 shows a 4-bit ripple adder/subtracter for numbers represented in two's complement.
Figure 3A:
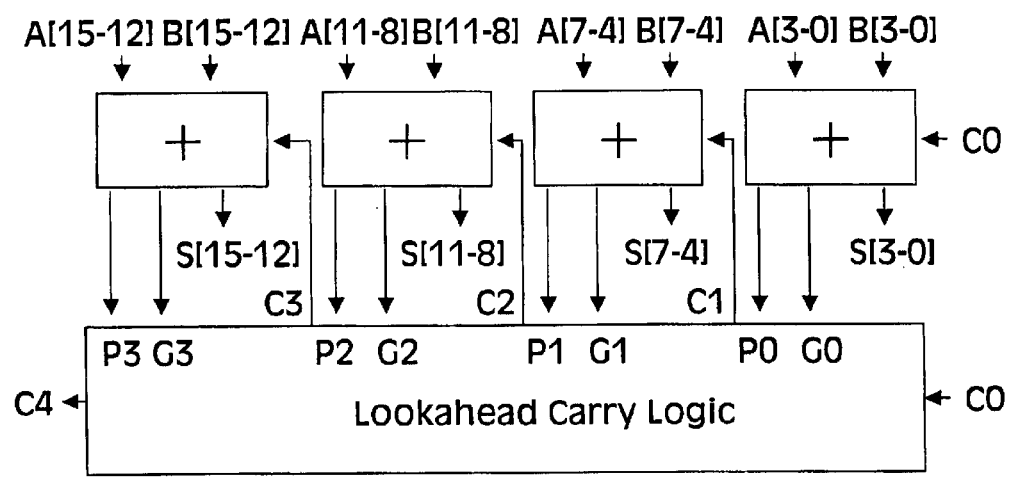
FIG. 3a shows a carry-lookahead adder circuit.
Figure 3B:
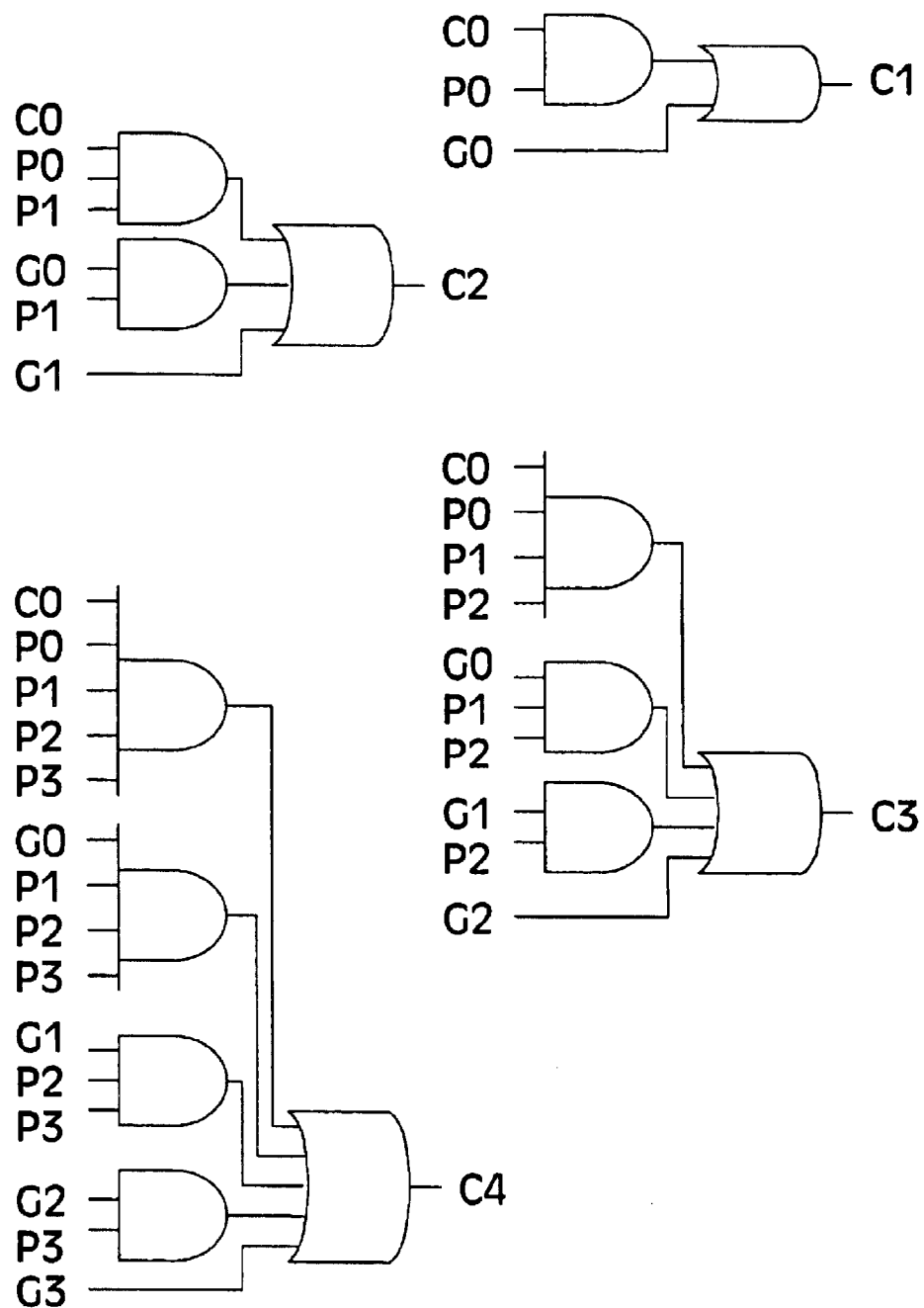
FIG. 3b shows the circuits used to produce carry propagate and carry generate signals and to propagate the carry signal in a carry-lookahead adder.
Figure 3C:
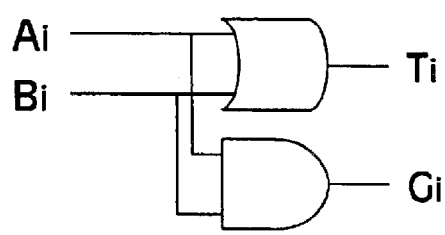
FIG. 3c shows alternative circuits used to propagate the carry signal according to Ling's equations in an alternative carry-lookahead adder.
Figure 3C:
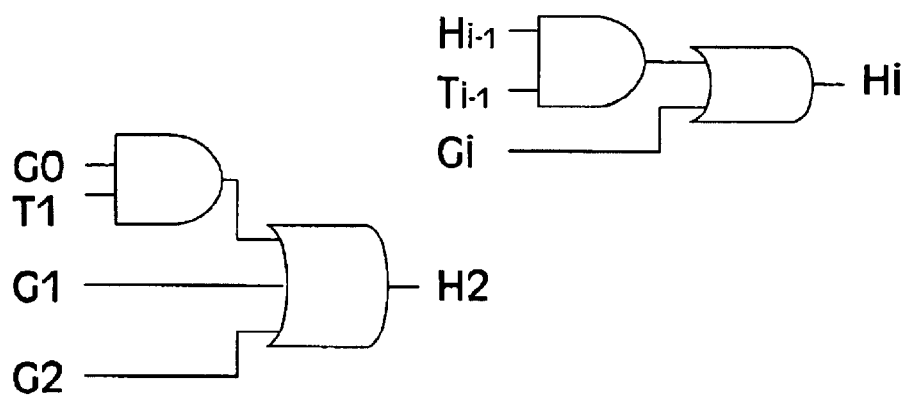
Figure 3C:
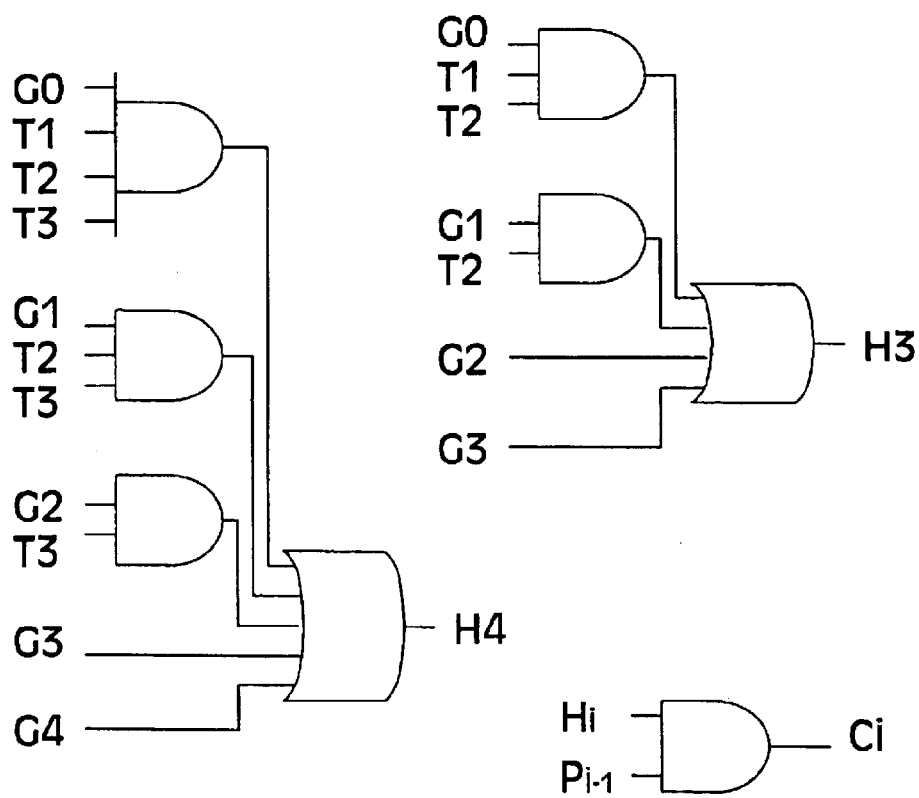
Figures 4, 5:
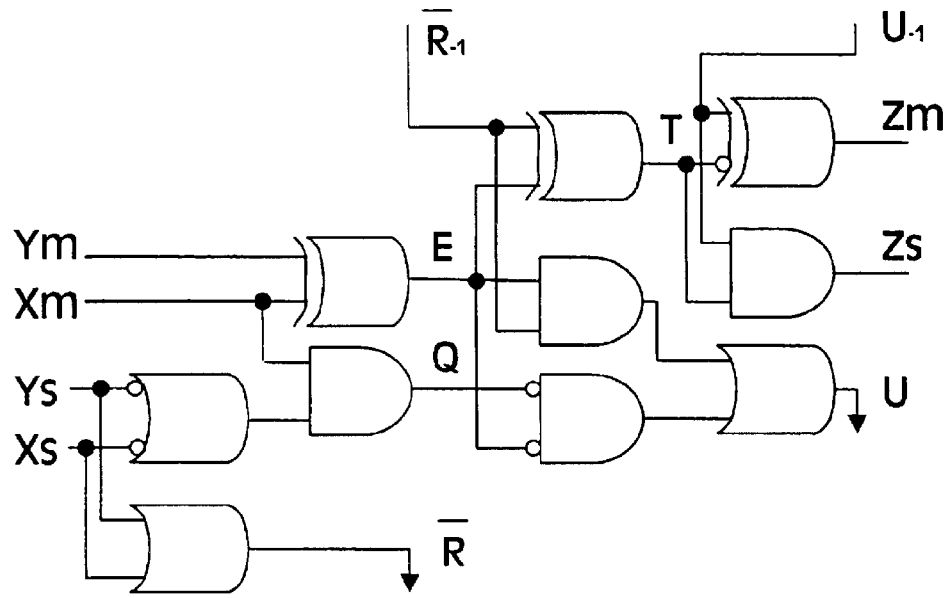
FIG. 4 shows a signed-digit adder circuit of a prior art redundant arithmetic method.
FIG. 5 shows rules for a method of adding numbers represented in signed-digit redundant form.
Figure 6:
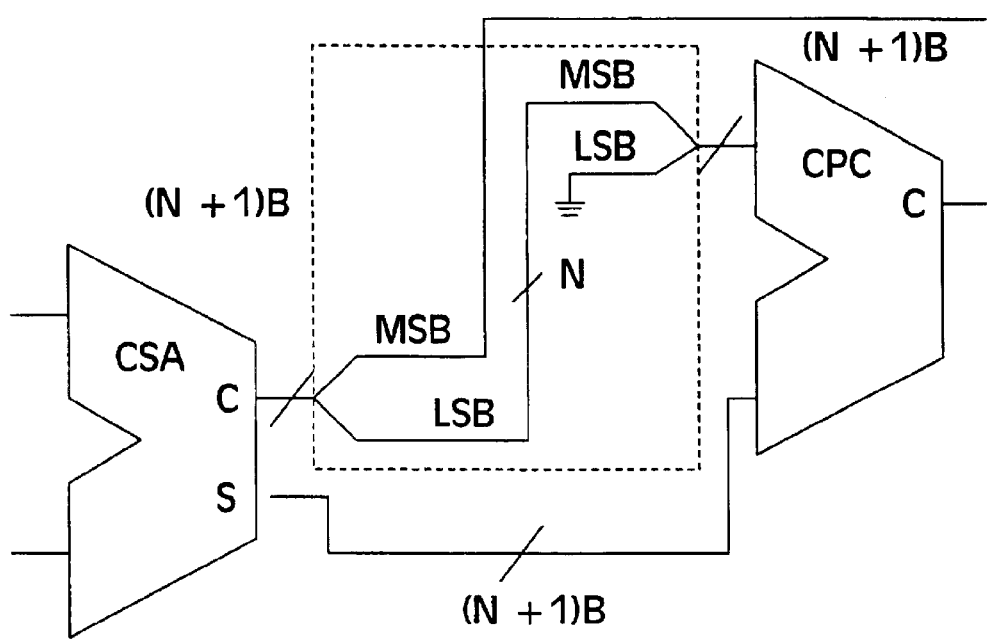
FIG. 6 shows a prior art three input comparator using a custom carry-save adder to add two inputs to an implicit constant and a carry-propagation circuit to generate a result of the comparison.

In a twos complement binary representation, where n is the number of bits used to represent the number each specific number, from $-2^{n-1}$ to $2^{n-1}-1$, has exactly one representation. This fact is illustrated in FIG. 2c. However, in a redundant representation, there are multiple valid combinations that can be used to represent any number. For example, when the number, zero, is represented with carry bits and sum bits as described above, there are $2^d$ redundant representations, where d is the number of binary digits in the number. These $2^d$ representations for zero using three digits are shown in FIG. 9a. An addition operation performed on any two valid representations of zero, from FIG. 9a, using a carry-save adder will result in another one of the valid representations for zero shown in FIG. 9a.

In order to derive all of the possible redundant representations for a given number A. One could start with one valid redundant representation of A, and perform addition operations using a carry-save adder upon the initial valid representation of A, with each valid representation of zero from FIG. 9a. For example, FIG. 9b shows all of the valid redundant representations of the number negative three (−3) using three digits. Redundant representation 927 can be derived from the twos complement representation of −3 (in binary 101) by inserting 0s for each digit's carry bit. Then redundant representation 920 can be derived by adding the redundant zero representation 917 to the redundant −3 representation 927. Redundant representation 921 can be derived by adding the redundant zero representation 912 to the redundant −3 representation 927. Redundant representation 922 can be derived by adding the redundant zero representation 911 to the redundant −3 representation 927. Redundant representation 923 can be derived by adding the redundant zero representation 914 to the redundant −3 representation 927. Redundant representation 924 can be derived by adding the redundant zero representation 913 to the redundant −3 representation 927. Redundant representation 925 can be derived by adding the redundant zero representation 916 to the redundant −3 representation 927. Finally, redundant representation 926 can be derived by adding the redundant zero representation 915 to the redundant −3 representation 927.

Thus each valid redundant representation of a desired number can be derived from any other valid representation of a first number by performing addition operations with all valid redundant representations of a second number, provided that the first number and the second number sum to produce the desired number. Since it is known in the art, that a carry-save adder produces a valid result for a subtraction operation if the number being subtracted was negated in the twos complement representation method, the above description informs us that the carry-save adder produces valid results for all other redundant representations of the number to be subtracted. The present invention provides an efficient way of determining a correct redundant representation corresponding to a negation of each valid redundant representation of a number to be subtracted.

Referring once again to FIGS. 9a and 9b, one can observe from the tables shown that the redundant representation for the number zero, 910, if complemented using bitwise negation, produces the redundant representation for the number negative three, 920. Likewise, the complement of redundant representation, 911, produces similarly the redundant representation, 921, and so on for each valid redundant representation of zero shown in FIG. 9a. Therefore, any subtraction of zero using a carry-save adder would produce a result that was incorrect by a difference of exactly three if the redundant representation of negative zero were produced using bitwise negation as the complement. Further, that result could be corrected by adding any valid representation of three back into the sum produced by the carry-save adder.

As seen in the above description, when this correction method works for one valid redundant representation of a number is also works for all valid redundant representations of that number. FIG. 10 shows a mapping from valid three digit redundant representations of numbers from negative four (−4) through three (3) into valid three-digit redundant representations for the same range of numbers. From the table, it can be seen that the complement of a number N represented in redundant form is a valid redundant representation of −N−3 modulo the size of the set of numbers represented (in the case shown by FIG. 10, the set size is eight).

The method described above for subtracting two numbers, A and B, represented in redundant form, having vectors of carry bits, $C_A$ and $C_B$, and vectors of sum bits, $S_A$ and $S_B$, can be expressed as follows:

$$A - B = (S_A + 2C_A) - (S_B + 2C_B)$$
$$= (S_A + 2C_A) + (-S_B - 2C_B)$$
$$= (S_A + 2C_A) + ((\sim S_B + 1) + 2(\sim C_B + 1))$$
$$= (S_A + 2C_A) + (\sim S_B + 2(\sim C_B) + 3)$$

where a bitwise complement operation is indicated by the symbol, "$\sim$".

Thus an efficient method for generating a redundant representation corresponding to the negation of a number represented in redundant form, and for correcting that representation through use of a carry-save adder circuit to produce a valid result in redundant form corresponding to a subtraction operation is herein disclosed.

One embodiment of the present invention uses a circuit having functionality similar to those shown in FIG. 7b or FIG. 7c to construct a carry-save adder structure. Referring once again to the carry-save adder structure shown in FIG. 8. This adder completes the addition operation in two stages. Stage one, 810, receives as inputs three input bits for each digit in the representation of the numbers to be added and outputs two bits for each digit to stage two, 811. Each stage is a regular structure constructed of blocks like the one shown, 801, which perform the functions of the circuit shown in FIG. 7b. Stage two, 811, receives as inputs the intermediate sum and carry results from stage one, 810, and also receives a fourth input bit from each digit of one of the input operands. Stage two, 811, produces a redundant representation having a sum bit and a carry bit for each digit of the resulting sum of the two input operands.

Figure 11:
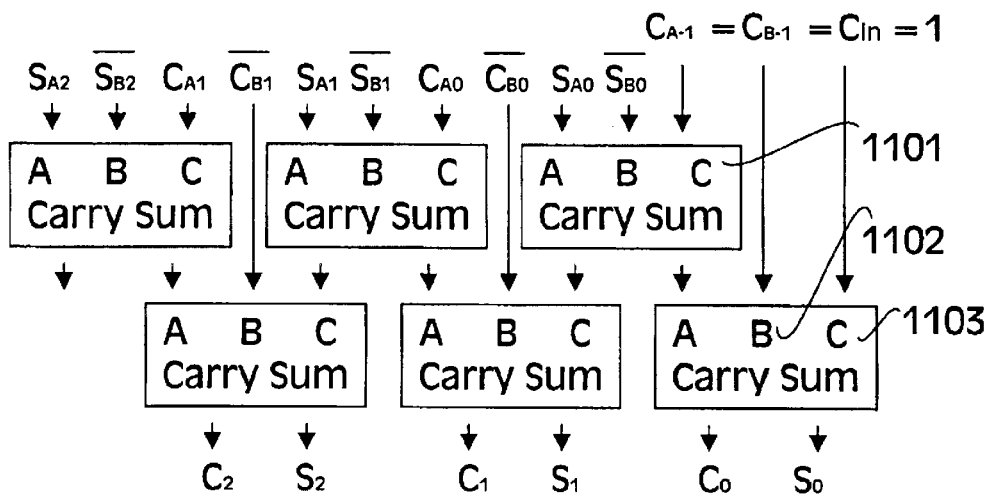
FIG. 11 shows one embodiment of a redundant adder being used to perform subtraction on operands received in redundant form using one possible arithmetic apparatus and one possible method of providing adjustment input.

FIG. 11 shows a carry-save adder structure, like the one described in FIG. 8, being used in one alternative embodiment of the invention to perform a subtraction operation A−B, where B is a number represented by any one of its possible valid redundant representations. In order to perform the subtraction operation, each of the carry bits and each of the sum bits in a redundant representation of B are complemented and supplied to the carry-save adder. Then a result is corrected by adding an adjustment of three. This is performed in FIG. 11, by setting three carry bits, $C_{A-1}$, $C_{B-1}$, and $C_{in}$ to a logic value of 1. When the combination of these three carry bits are received at the inputs provided in the carry-save adder circuit at, input 1101, input 1102 and input 1103, they are incorporated into the result. Thus the circuit configured as shown in FIG. 11, produces a valid redundant representation for the subtraction operation A−B.

Figure 12:
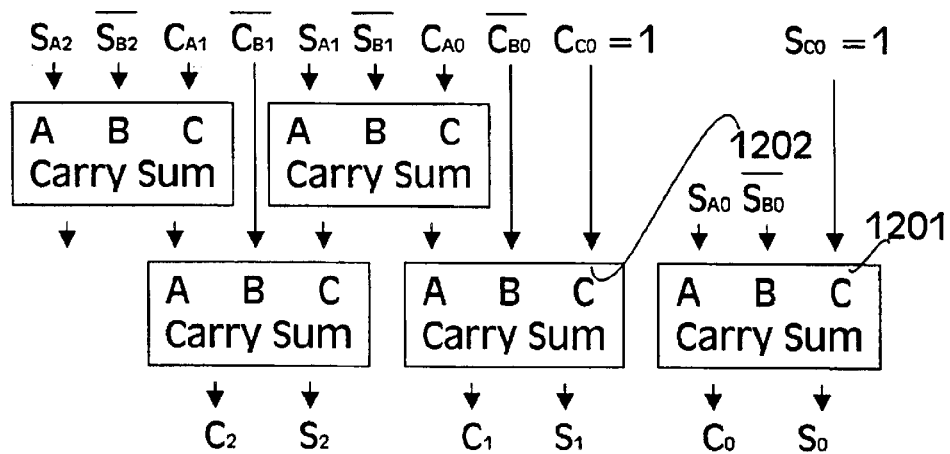
FIG. 12 shows another embodiment of a redundant adder being used to perform subtraction on operands received in redundant form using a second possible arithmetic apparatus and a second possible method of providing adjustment input.

FIG. 12 shows another alternate embodiment of the invention. As discussed above, any valid representation of the adjustment value can be used to correct the resulting sum. In FIG. 12, the least significant carry-save adder block receives, along with the least significant sum bits of the input operands, a least significant sum bit, $S_{C0}$, for the correction value at input 1201. The carry-save adder block that produces the second least significant digit, receives also a carry bit, $C_{C0}$, for the correction value at input 1202. Thus the circuit configured as shown in FIG. 12, also produces a valid redundant representation for the subtraction operation A−B.

By selecting a different form of redundant representation and perhaps a different redundant adder design, it is possible for those having skill in the art to change the adjustment value necessary to correct a result produced using the redundant adder circuit. It is also possible to use the method of the current invention to add and subtract more than two operands, thus changing the adjustment value or values necessary to correct the results produced.

Figure 13A:
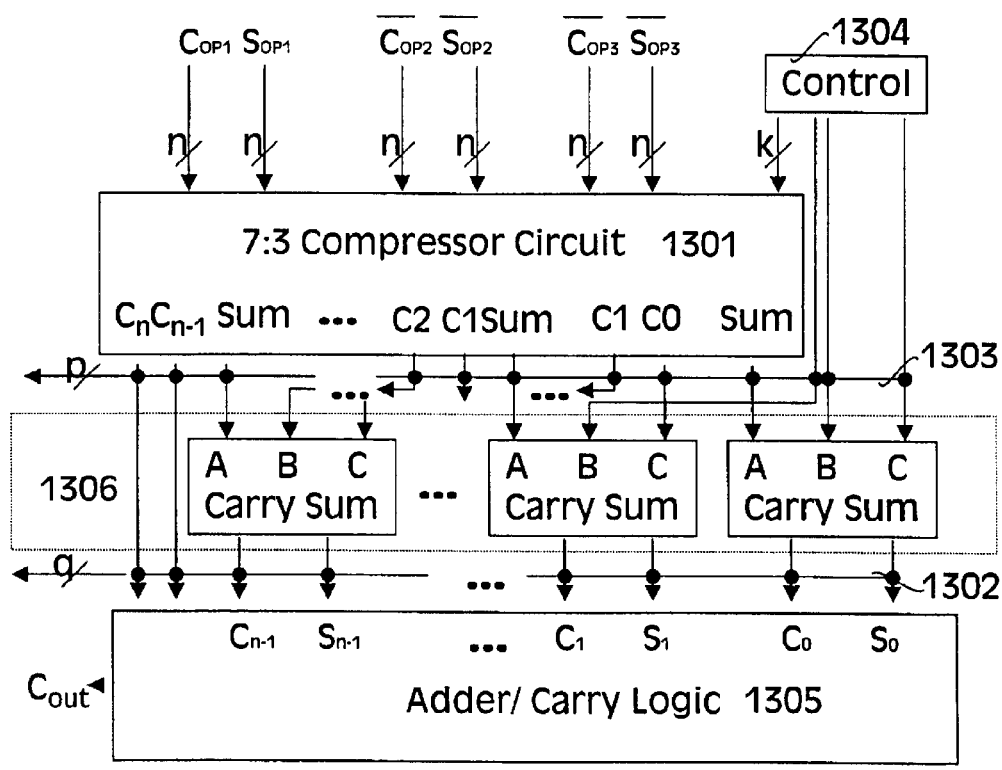
FIG. 13a shows another embodiment of a redundant adder being used to perform subtractions on operands received in redundant form using a third possible arithmetic apparatus capable of accepting up to three operands in redundant form and using a third possible method of providing adjustment input.

FIG. 13a shows another alternate embodiment of the invention, which can be used to sum three operands received in redundant form. Control device 1304 is used to correct the resulting sum through an adjustment input to a 7:3 compressor circuit, 1301, or a 3:2 compressor stage, 1306, or both.

In FIG. 13a, a result can be tapped for bypassing as an operand of another operation while in redundant form. If a result is tapped for bypassing after adder stage 1306 and before a carry propagation stage, 1305, as shown by the tap, 1302, then a bypassed operand is available in a redundant form having one carry bit and one sum bit per digit, similar to that of the input operands, without needing to wait for carry propagation. But a result could also be tapped for bypassing before stage 1306, as shown by tap, 1303. In such a case, the operand is in a second redundant form having two carry bits and one sum bit per digit.

The adder shown in FIG. 13a is capable of accepting two operands in this second redundant form, and control 1304 can provide adjustment input to either circuit 1301 or circuit 1306 or both to correct results when inputs are provided in either redundant form. Thus the circuit configured as shown in FIG. 13a, produces valid redundant representation for two or three operand addition/subtraction operations.

Figure 13B:
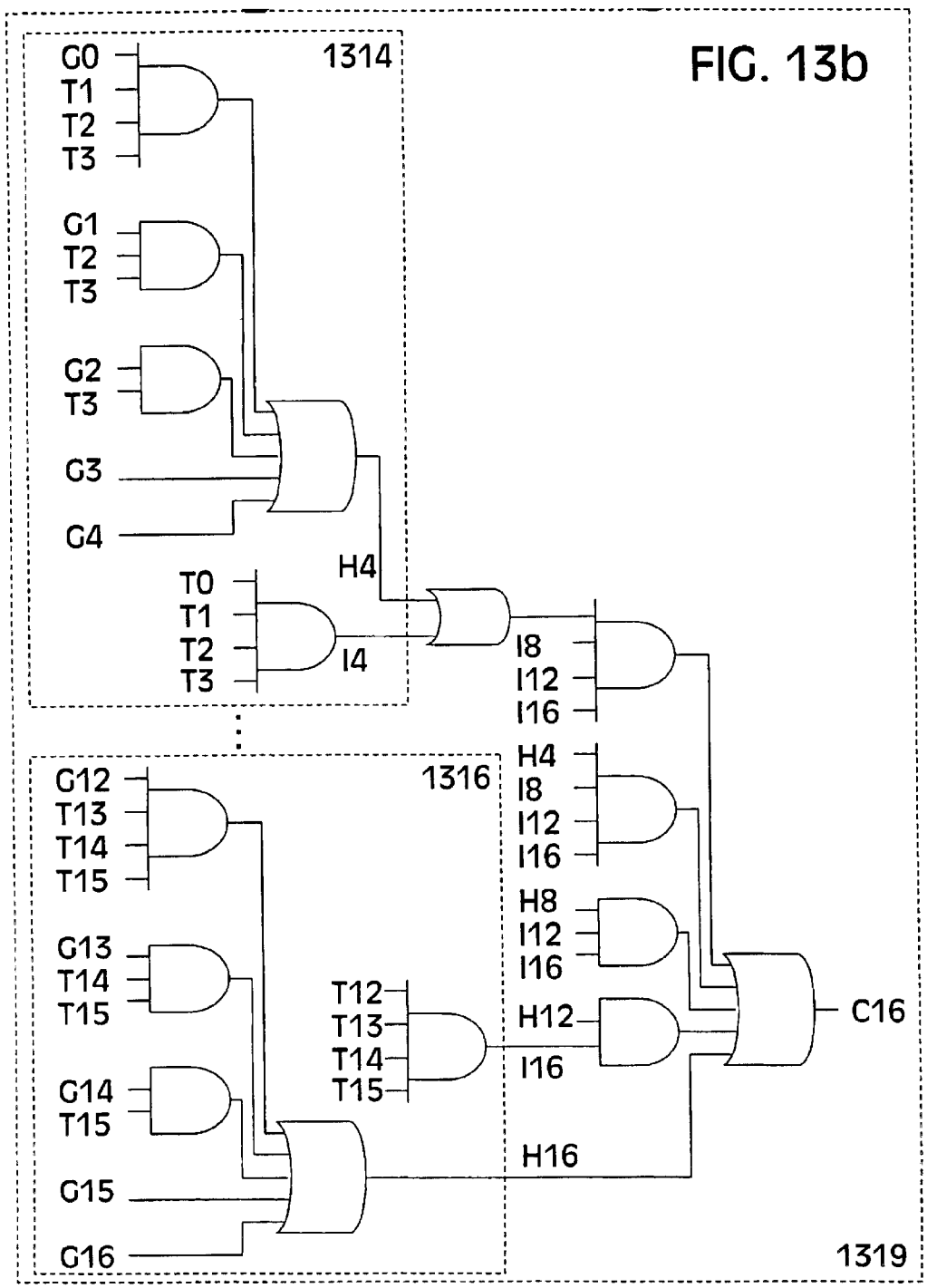
FIG. 13b shows one embodiment of carry logic to propagate a carry signal according to Ling's equations.

FIG. 13b shows one embodiment of carry logic 1319 to propagate a 16-bit carry signal for an addition A+B according to Ling's equations, which provide that:

$H_i$=OR($G_i$, AND ($T_{i-1}$, $G_{i-1}$)) and $I_i$=AND ($T_{i-1}$, $T_{i-2}$, $T_{i-3}$, $T_{i-4}$)

where $G_i$=AND ($A_i$, $B_i$) and $T_i$=OR ($A_i$, $B_i$).

Carry logic 1314 generates a 4-bit pseudo-carry signal H4 and a propagate signal I4 which are propagated by carry logic 1319. Similarly, carry logic 1316 generates a 4-bit pseudo-carry signal H16 and a propagate signal I16 which are propagated by carry logic 1319.

Figure 13C:
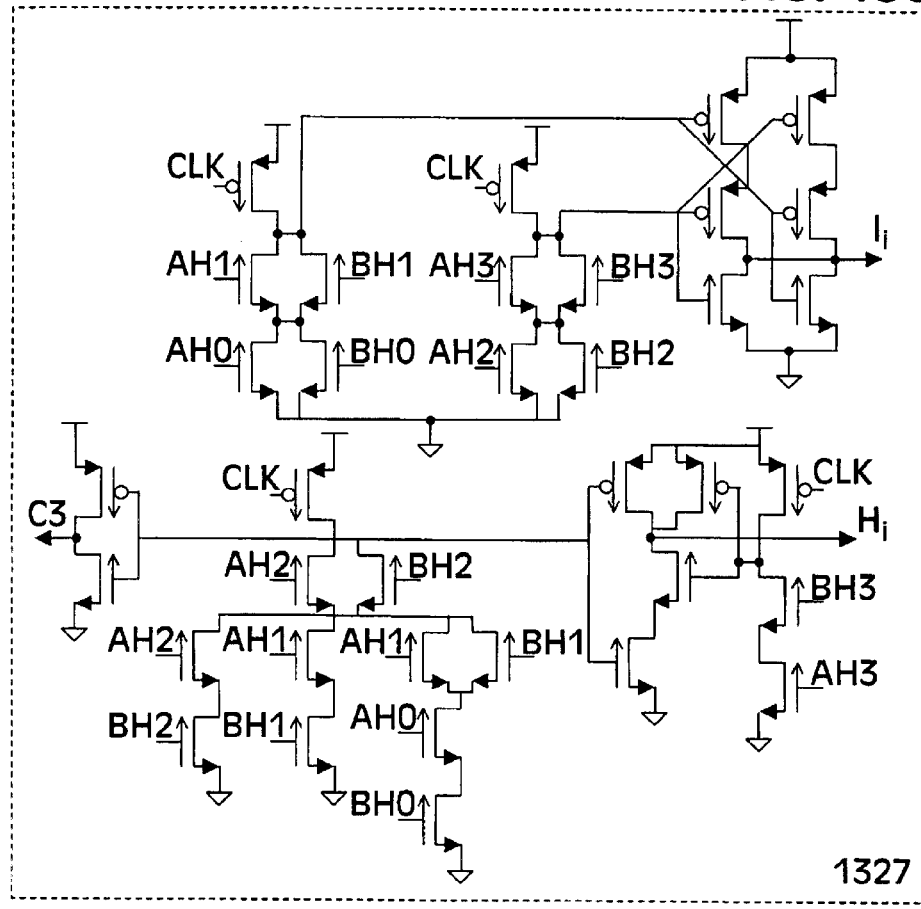
FIG. 13c details an alternative H4 and I4 generation logic, according to Naffziger, for producing the H4 and I4 directly from input operands in a single gate delay.

It will be appreciated that a 4-bit pseudo-carry signal and a propagate signal may be generated in a number of ways. For example, FIG. 13c details an alternative H4 and I4 generation logic 1327, according to Naffziger ("A sub-nanosecond 0.5 mm 64-bit adder design," ISSCC Digest of Technical Papers, 1996, pp. 362–3), for producing the H4 and I4 directly from high active input signals AH3, AH2 . . . AH0 and low active input signals AL3, AL2 . . . AL0 of operand A and from high active input signals BH3, BH2 . . . BH0 and low active input signals BL3, BL2 . . . BL0 of operand B in a single gate delay.

Figure 13D:
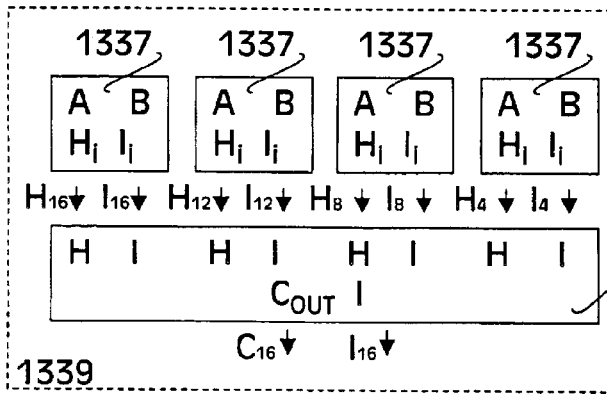
FIG. 13d shows an alternative carry logic to propagate a carry signal according to Ling's equations.

FIG. 13d shows an alternative carry logic 1339 to propagate a 16-bit carry signal for an addition A+B according to Ling's equations. Carry logic 1337 generates 4-bit pseudo-carry signals H16, H12, H12, H4, and propagate signal I16, I12, I8, and I4 which are propagated by carry logic 1338. For one preferred embodiment carry logic 1337 and carry logic 1338 provide their respective output signals, each in a single gate delay.

Figure 13E:
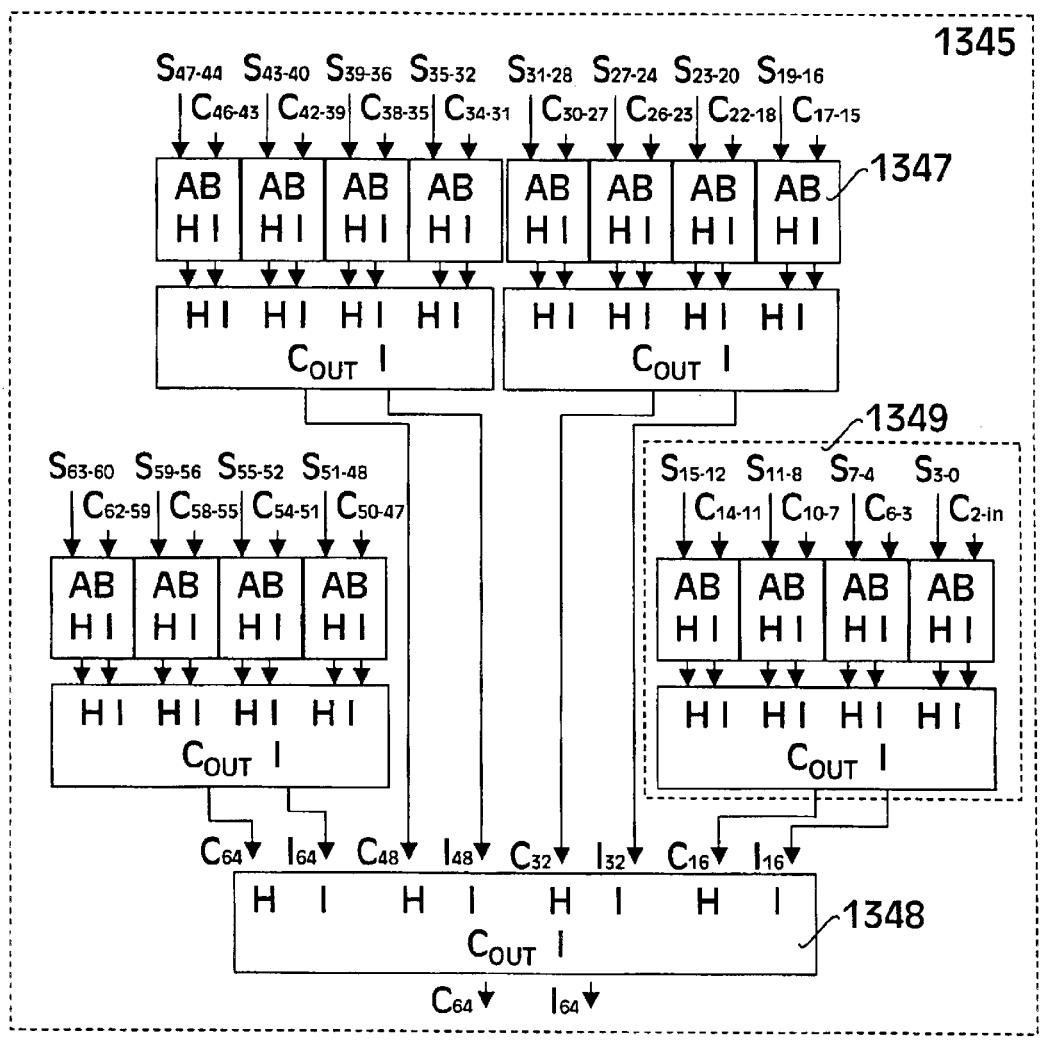
FIG. 13e shows one embodiment of a 64-bit carry logic to propagate a carry signal directly from operands received in redundant form according to Ling's equations.

FIG. 13e shows one embodiment of a 64-bit carry logic 1345 to propagate a 64-bit carry signal directly from an operand received in redundant form having vectors of carry bits, $C_{63}$ to $C_0$, and sum bits, $S_{63}$ to $S_0$, according to Ling's equations. Carry logic 1349 comprises carry logic 1347. Carry logic 1347 generates 4-bit pseudo-carry signals, H, and propagate signals, I, which are propagated through carry logic 1349 to generate 16-bit carry signals, C64, C48, C32, C16, and propagate signals, I64, I48, I32, and I16, which are then propagated through carry logic 1348. For one preferred embodiment carry logic 1347, and carry logic 1348 provide their respective output signals, each in a single gate delay and carry logic 1345 provides its output signals, in three gate delays.

Figure 14:
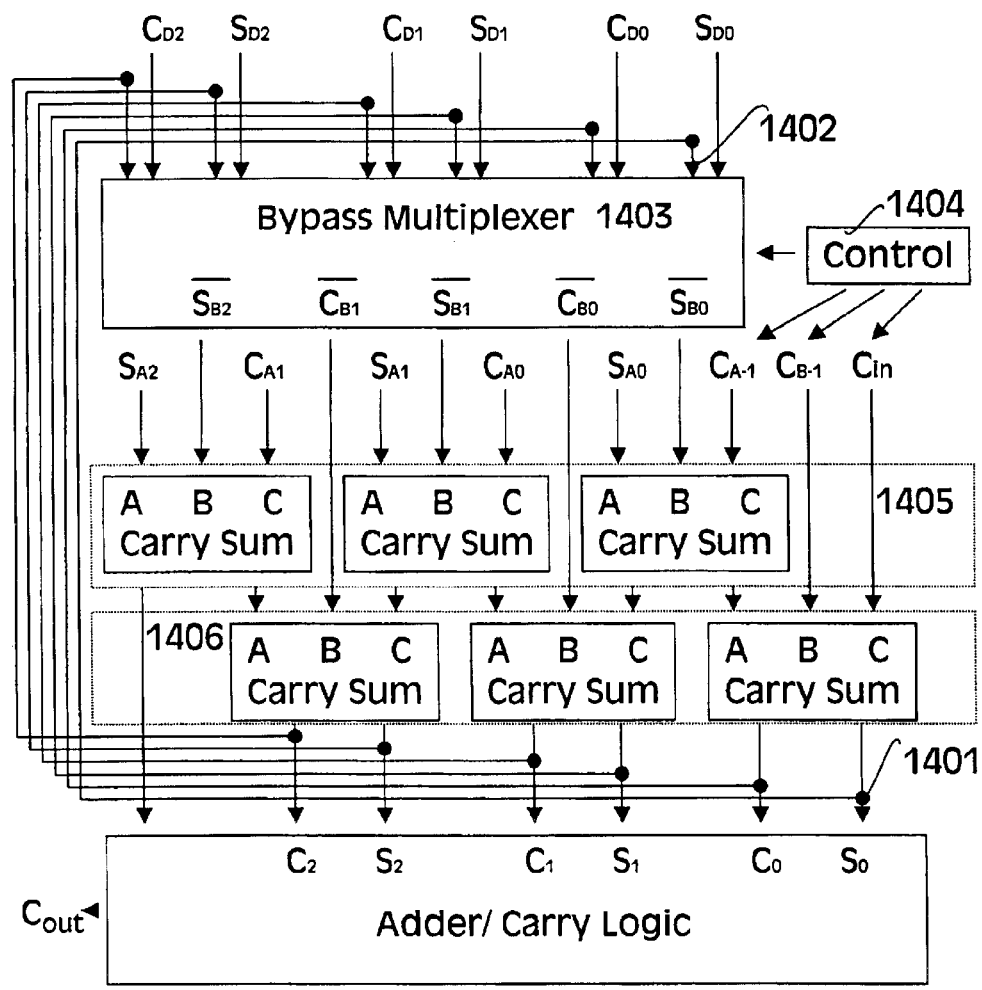
FIG. 14 shows another embodiment of a redundant adder being used to perform subtraction on operands received in redundant form with a fourth possible arithmetic apparatus and a detailed illustration of one possible method to bypass operands in redundant form.

FIG. 14 shows another alternate embodiment of the invention including a bypass multiplexer, 1403, to receive, at input 1402, a result bypassed from a tap, 1401, on the output of adder stage 1406. Control device, 1404, selects between an input operand, D, and a bypassed operand, 1402. If the operation to be performed is a subtraction, then Control device, 1404, also selects a complemented output to supply to the B input of adder stage, 1405, and sets adjustment input appropriately. In this case, adjustment input is set as shown in FIG. 11.

Figure 15:
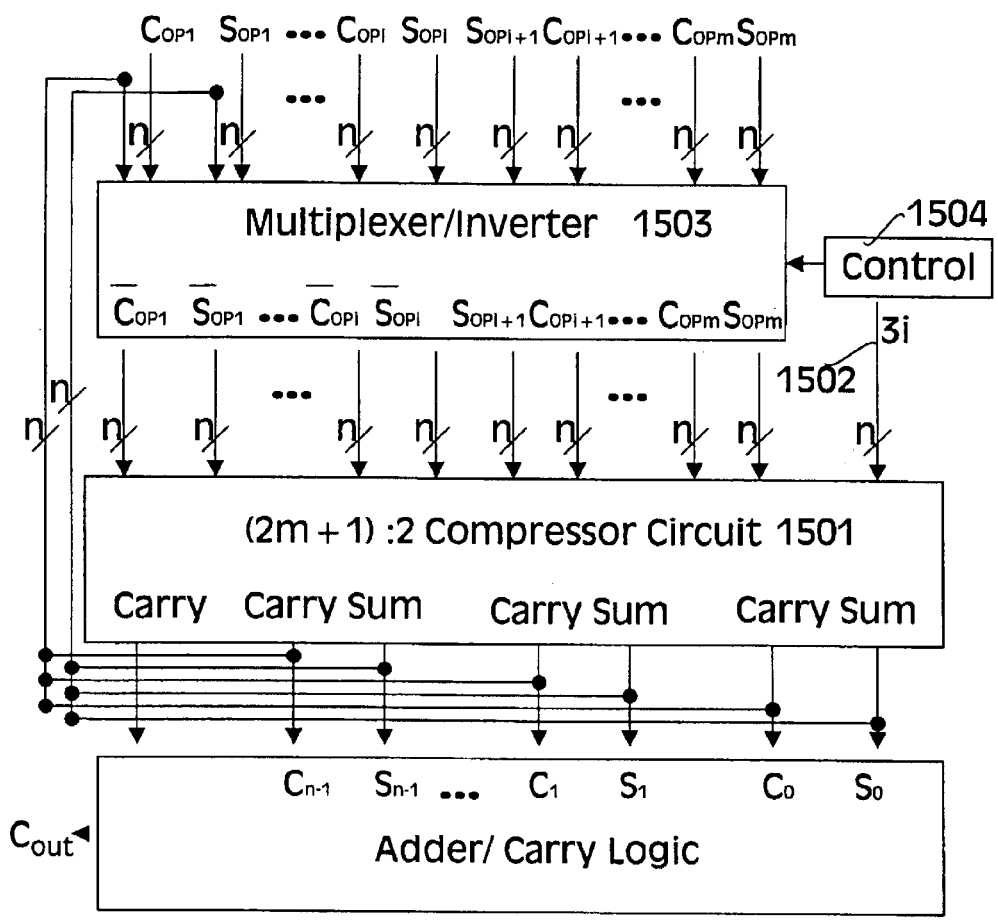
FIG. 15 shows another embodiment of a redundant adder being used to perform subtraction on operands received in redundant form with a fifth possible arithmetic apparatus capable of accepting m operands, each operand comprising n digits represented in redundant form, and subtracting i operands from the sum of the remaining m-i operands. Any of the m operands can be bypassed from results, tapped in redundant form at the outputs of one of a plurality of stages, in similar or dissimilar redundant arithmetic apparatuses.

FIG. 15 shows another alternate embodiment of the invention, which accepts up to m operands in a redundant form. The inputs can be bypassed from a compressor stage of circuit 1501 or from some other arithmetic circuit or supplied by a register file or by memory storage. Operands have n digits, each digit including a carry bit and a sum bit. Any number, i, of the m operands (for I between zero and m) may be negated by complementing the appropriate i*2n output bits of multiplexer/inverter, 1503, under the direction of control, 1504, and adjusting the result produced by circuit 1501 by adding 3i via input, 1502, which is also directed by control, 1504.

Figure 16A:
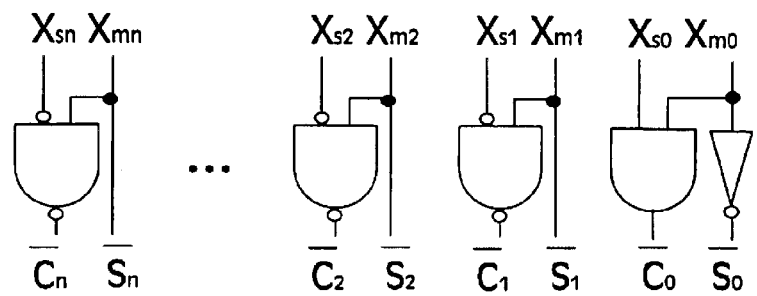
FIG. 16a shows one embodiment of a circuit for complementing a number received in a signed-digit redundant form for subtraction according to the process of FIG. 17.

FIG. 16a shows one possible circuit to generate a complemented form of a number received in redundant form. The number provided to the circuit is represented in a signed-digit redundant form. The number generated by the circuit is in a carry-sum redundant form and complemented in accordance with the methods presently disclosed for the sake of illustration.

Figure 16B:
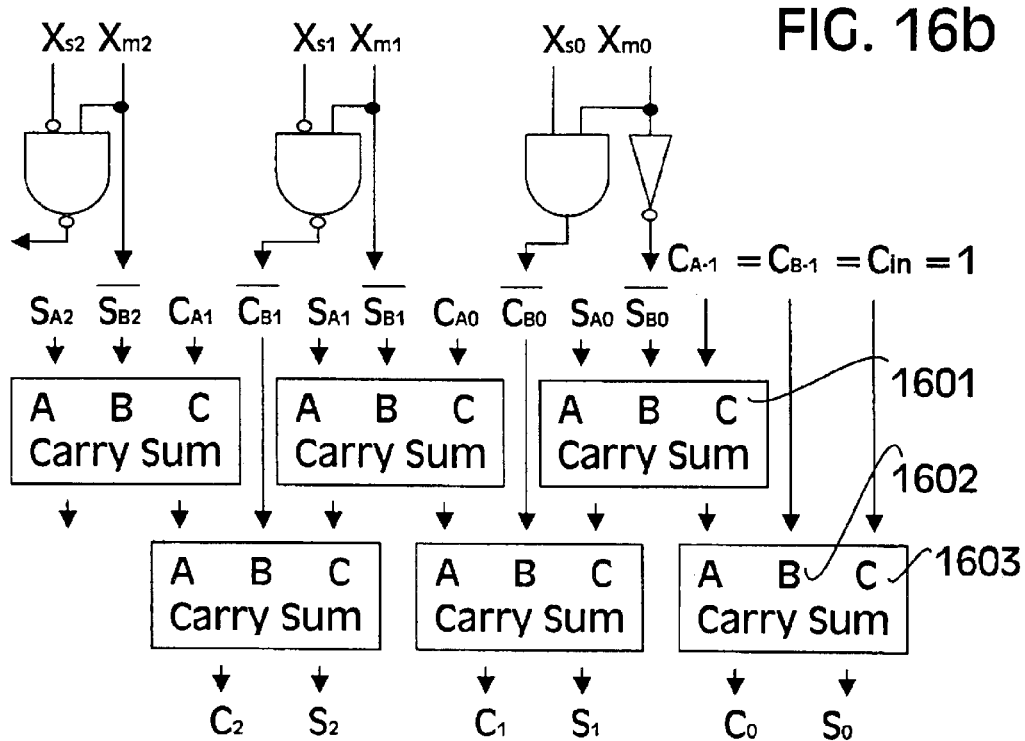
FIG. 16b shows an embodiment of a circuit capable of performing addition and subtraction operations on numbers received in a signed-digit redundant form or a carry-sum redundant form.

FIG. 16b shows a carry-save adder structure, like the one described in FIG. 8, being used in combination with the complementing circuit of FIG. 16a in another alternative embodiment of the invention to perform a subtraction operation A−B, where B is a number represented by any one of its possible valid signed-digit redundant representations. In order to perform the subtraction operation, all but the least significant signed-bit is negated, and each of the resulting sign-bits is ANDed with its respective magnitude-bit and then, all but the least significant result is negated. Finally, only the least significant magnitude-bit is negated. Thus the complemented carry bits and sum bits in a redundant representation of B are generated and supplied to the carry-save adder. Then a result is corrected by adding an adjustment of three. This is performed in FIG. 16b, by setting three carry bits, $C_{A-1}$, $C_{B-1}$, and $C_{in}$ to a logic value of 1. When the combination of these three carry bits are received at the inputs provided in the carry-save adder circuit at, input 1601, input 1602 and input 1603, they are incorporated into the result. Thus the circuit configured as shown in FIG. 116b, produces a valid redundant representation for the subtraction operation A−B.

It should be apparent that the methods herein disclosed can be modified in arrangement and detail by those skilled in the art without departing from the principles of the present invention.

Figure 17:
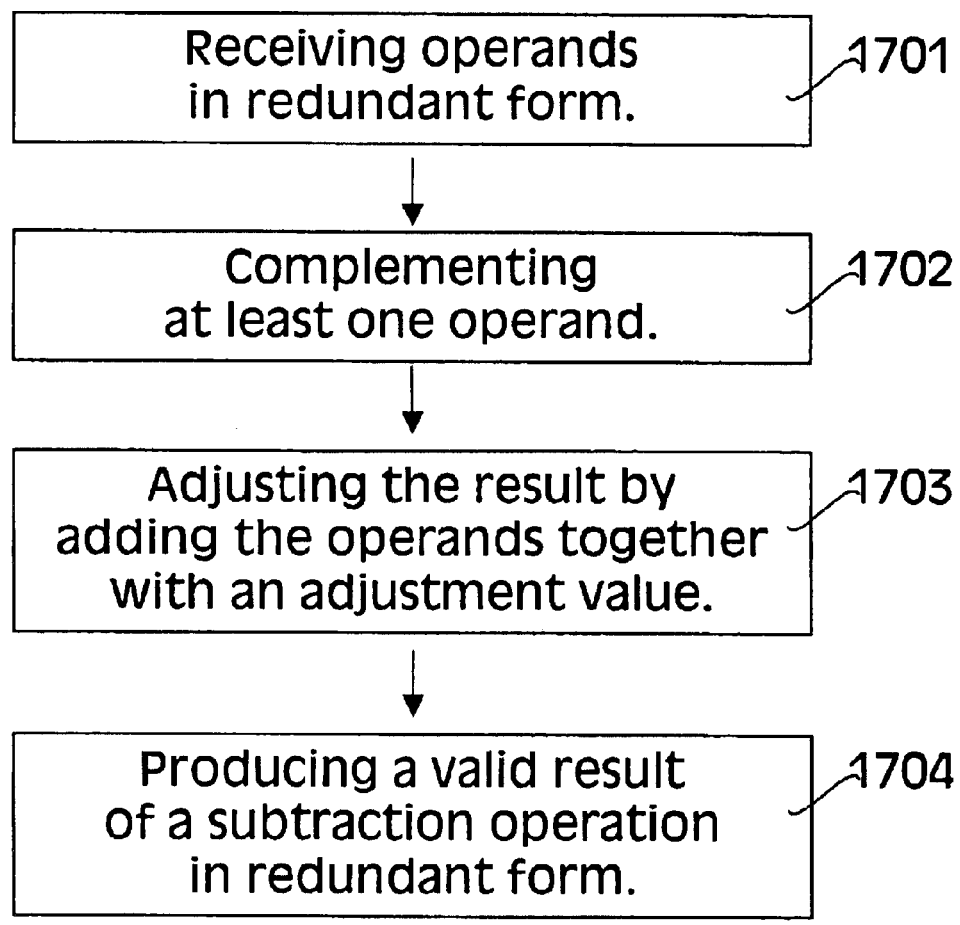
FIG. 17 diagrams a process for performing subtraction in redundant form arithmetic.

FIG. 17 diagrams a process for subtracting numbers represented in redundant form. The process is performed by processing blocks that may comprise software or firmware operation codes executable by general purpose machines or by special purpose machines or by a combination of both.

The process comprises complementing, in processing block 1702, at least one of the operands received in redundant form, in processing block 1701; and adjusting a result produced by adding an adjustment value, in processing block 1703, to produce a valid outcome of a subtraction operation, in processing block 1704, represented in redundant form. As was discussed previously, and adjustment value that is a multiple of three will produce valid outcomes using carry save arithmetic and redundant digits having one carry bit and one sum bit.

In order to compare results produced in redundant form quickly, it is desirable to make use of a non-propagative comparator so that the result can be obtained prior to carry propagation. Cortadella et al. have described an equality comparison circuit for use with two's complement arithmetic in an article entitled, "Evaluation of A+B=K Conditions Without Carry Propagation," found in IEEE Transactions on Computers, vol. 41, No. 11, November 1992. A similar circuit can be used to compare results in redundant form.

Figure 18A:
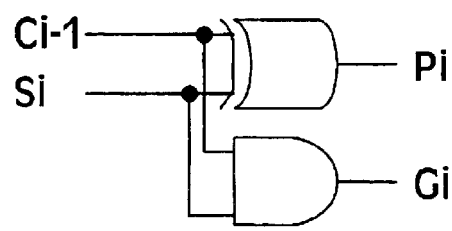
FIG. 18a shows one possible way that a carry-propagate signal and a carry-generate signal can be generated inside an adder/carry logic circuit for use with numbers in carry-sum redundant form.

FIG. 18a shows a half adder with inputs of a sum-bit and a carry-bit to be added together. This is one way that a carry-propagate signal and a carry-generate signal can be generated inside an adder/carry logic circuit for use with numbers in carry-sum redundant form.

Figure 18B:
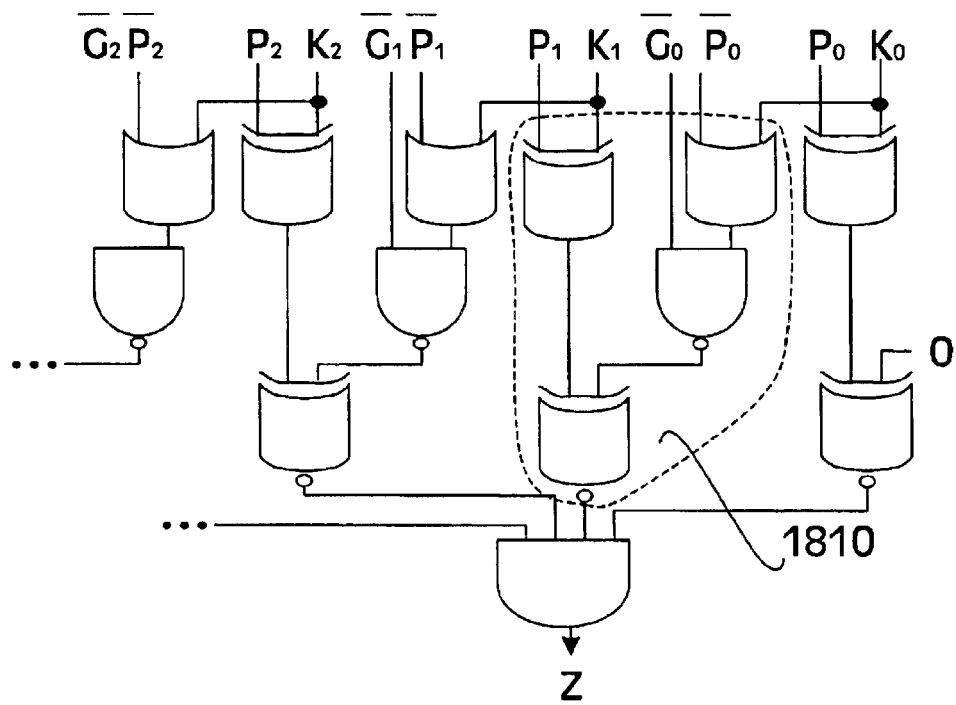
FIG. 18b shows one possible circuit for generating an equality comparison result using carry-propagate signals and carry-generate signals without requiring carry propagation.

FIG. 18b shows one possible circuit for generating an equality comparison result using carry-propagate signals and carry-generate signals without requiring carry propagation. The circuit 1810 produces an equality comparison for digit one of the redundant representation to digit one of a number K. Likewise, similar circuits produce results for each digit position. The final comparison result is collected into Z, without need for carry propagation.

Figure 19A:
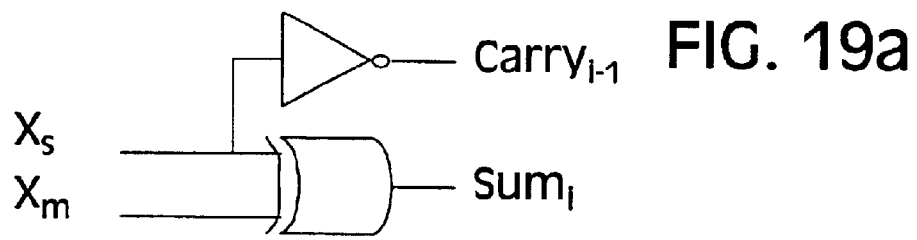
FIG. 19a shows one possible circuit for generating carry-sum inputs for the circuit of FIG. 18a from a number represented in signed-digit redundant form.

FIG. 19a shows another circuit for generating a carry-sum representation from a signed-digit representation. The values produced are suitable inputs for the circuit of FIG. 18a. Therefore the circuit of FIG. 18b can also be used if the result to be compared is in a sign-digit redundant representation.

Figure 19B:
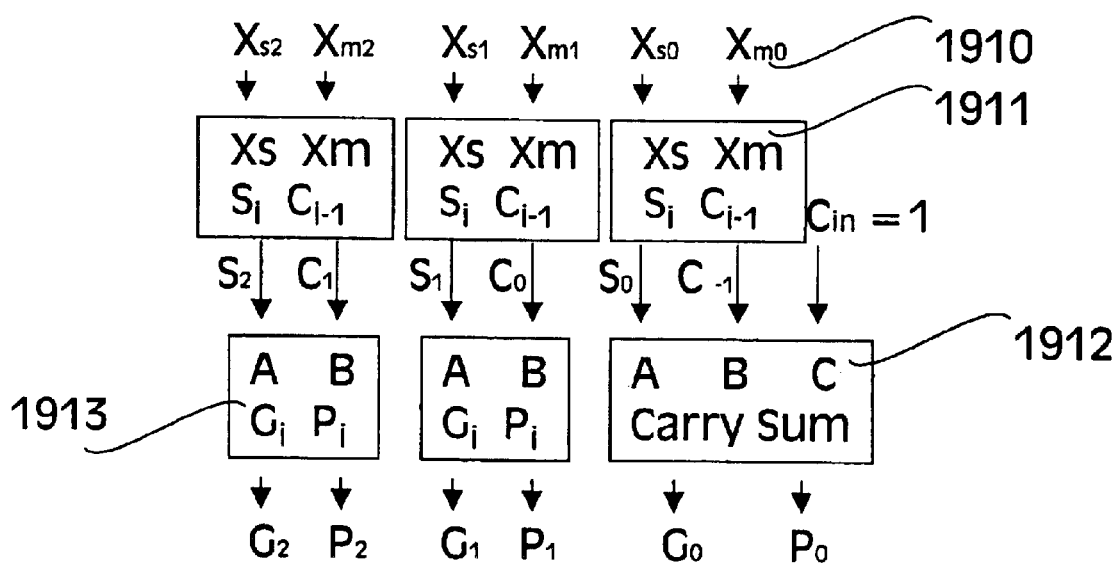
FIG. 19b shows one possible way that a carry-propagate signal and a carry-generate signal can be generated inside an adder/carry logic circuit for use with numbers in signed-digit redundant form.

FIG. 19b shows a circuit that could be part of an adder/carry logic circuit generating a carry-propagate signal and a carry-generate signal suitable for use with the non-propagative comparator circuit of FIG. 18b. The sign and magnitude values at a digit such as 1910 are input to a circuit 1911, which is similar the one shown in FIG. 19a. The results are combined using 3:2 compressor circuitry 1912 and half adder circuitry 1913 to produce carry-generate and carry-propagate signals suitable for use with the non-propagative comparator circuit of FIG. 18b.

Figure 20:
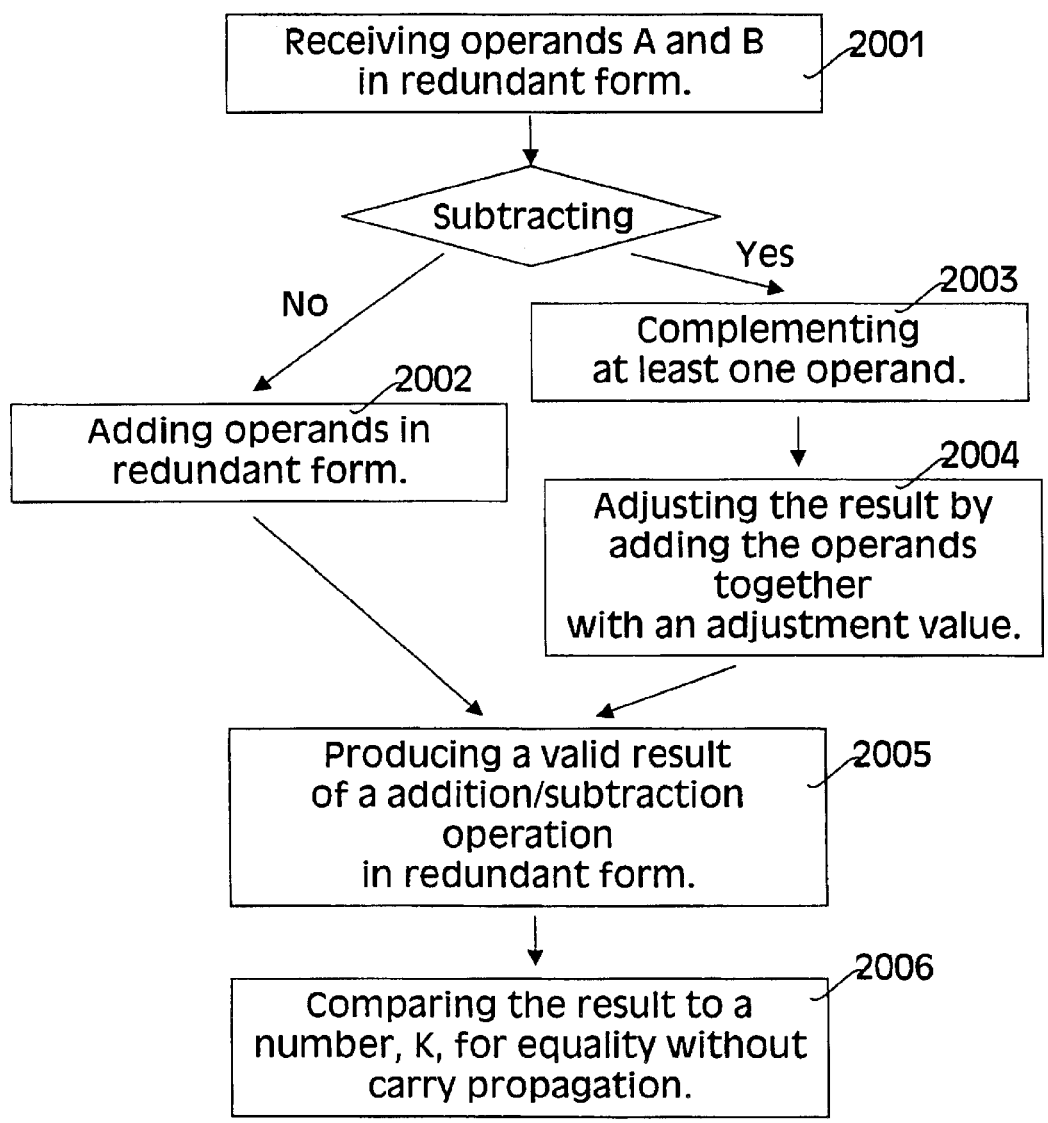
FIG. 20 diagrams a process for performing an addition or a subtraction in redundant form arithmetic and also performing an equality comparison without carry propagation for any of the operations.

FIG. 20 shows a method for performing an addition or a subtraction in redundant form arithmetic, thereby producing a valid result in redundant form, and also performing an equality comparison without carry propagation for any of the required operations.

Figure 21A:
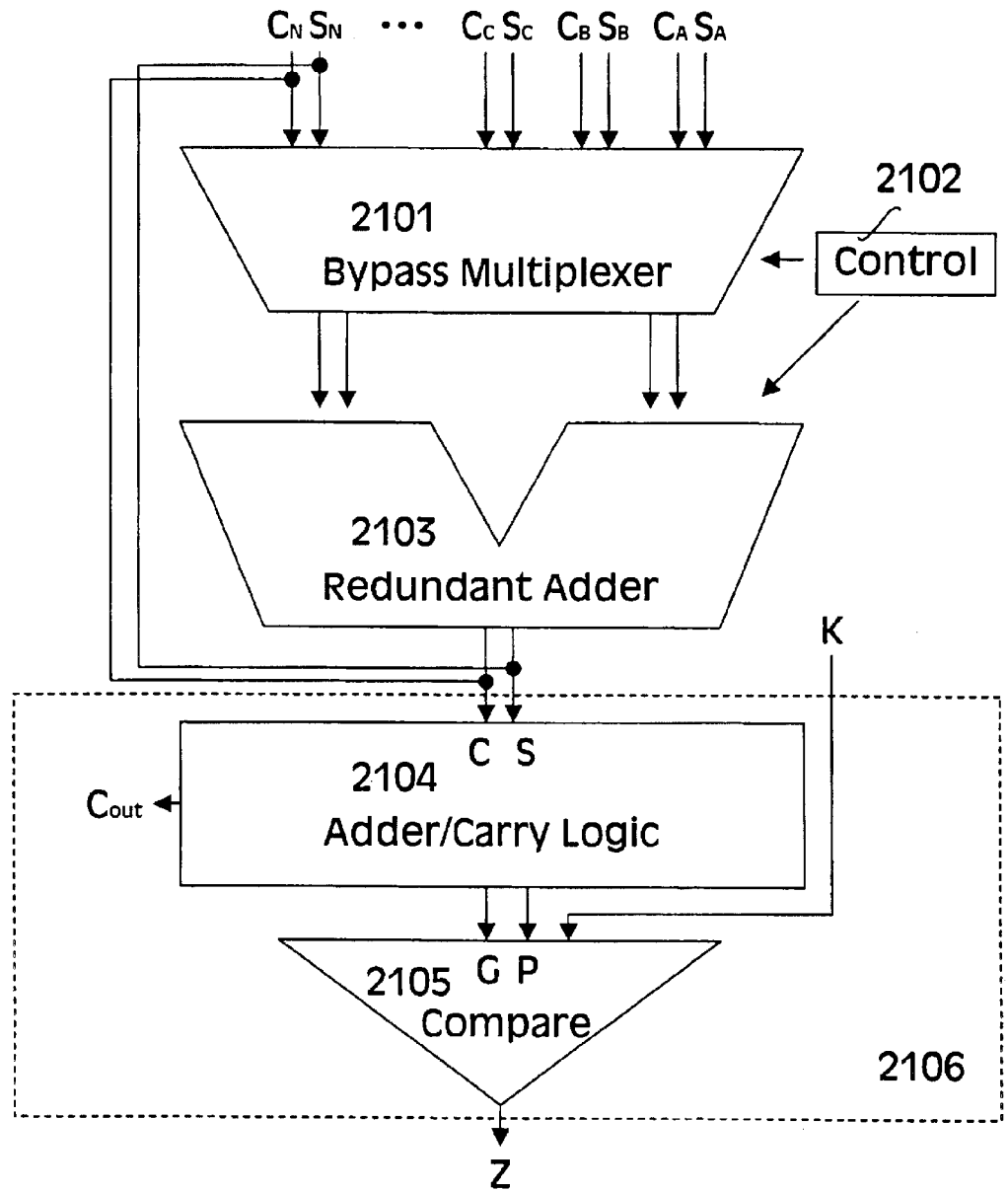
FIG. 21a shows one embodiment of a circuit with a redundant adder being used to perform addition or subtraction on operands received in a carry-sum redundant form, the operands possibly bypassed from similar or dissimilar circuits, and also with compare logic, similar to that shown in FIG. 18b, being used to perform an equality comparison without requiring carry propagation.

FIG. 21a shows one embodiment of a circuit, which can implement the method described in FIG. 20 with a redundant adder 2103 being used to perform addition or subtraction on operands received in a carry-sum redundant form and with input from control 2102 in accordance with the current method. The operands are possibly bypassed through bypass multiplexer 2101 from similar or dissimilar circuits. FIG. 21a further shows the current method implemented with a non-propagative comparator 2106 comprising adder/carry logic 2104 and compare logic 2105. The compare logic 2105 is similar to that shown in FIG. 18b, and is being used to perform an equality comparison without requiring carry propagation. As shown in FIGS. 18a, the necessary carry-generate and carry-propagate signals can be generated from the redundant result by adder/carry logic 2104 without need for carry propagation.

Figure 21B:
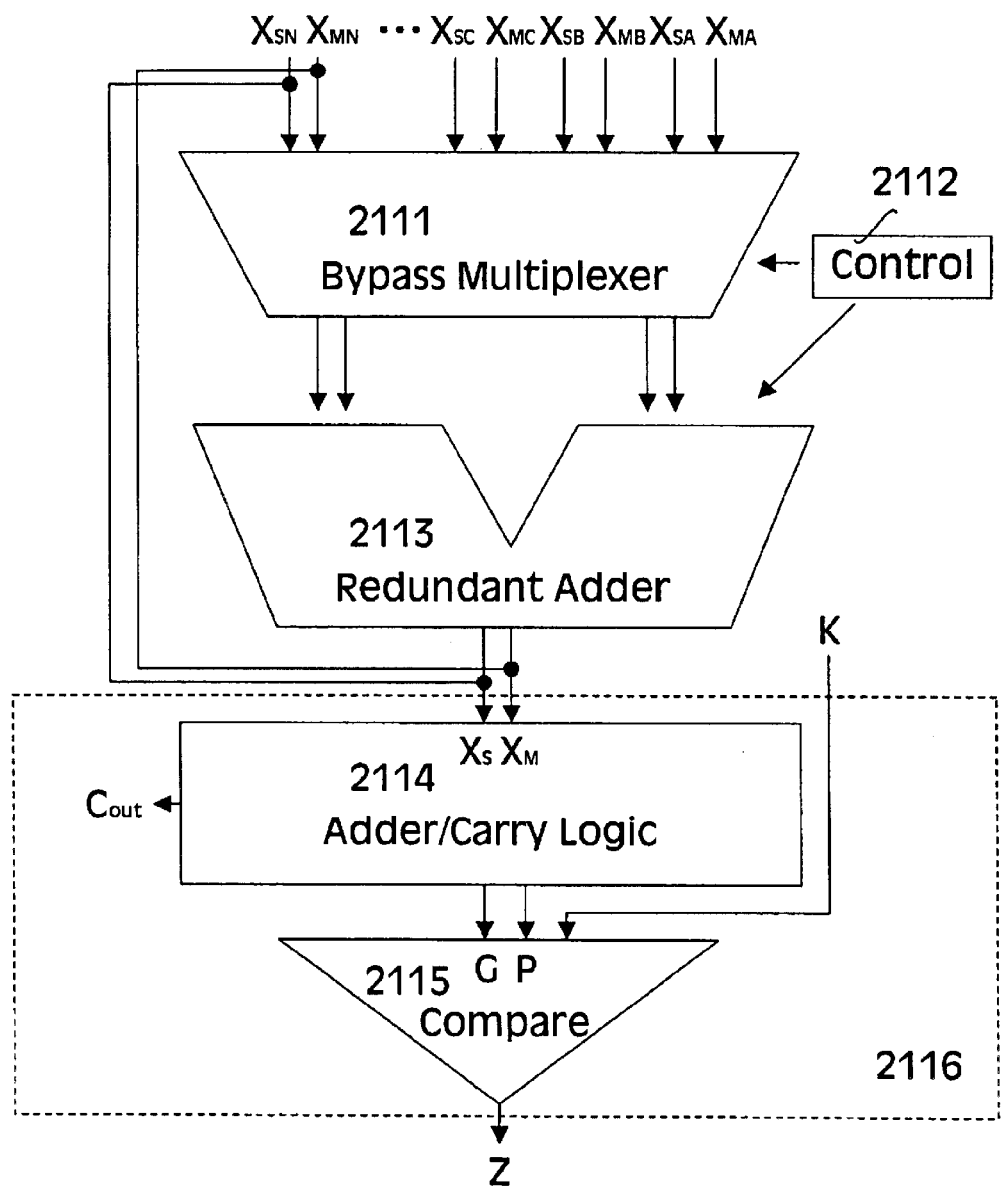
FIG. 21b shows another embodiment of a circuit with a redundant adder being used to perform addition or subtraction on operands received in a signed-digit redundant form, the operands possibly bypassed from similar or dissimilar circuits, and also with compare logic, similar to that shown in FIG. 18b, being used to perform an equality comparison without requiring carry propagation.

FIG. 21b shows another embodiment of a circuit, which can implement the method described in FIG. 20 with a redundant adder 2113 being used to perform addition or subtraction, this time on operands received in a signed-digit redundant form and with input from control 2112 in accordance with the current method. The operands are possibly bypassed through bypass multiplexer 2111 from similar or dissimilar circuits. FIG. 21b further shows the current method implemented with a non-propagative comparator 2116 comprising adder/carry logic 2114 and compare logic 2115. The compare logic is similar to that shown in FIG. 18b, and is being used to perform an equality comparison without requiring carry propagation. As shown in FIGS. 19b, the necessary carry-generate and carry-propagate signals can be provided from the redundant result by adder/carry logic 2114, also without need for carry propagation.

Thus what has been disclosed enables performing, at very high computation rates, efficient bypassing of operands in redundant form for operations including addition, subtraction and equality comparisons of redundant arithmetic results to another number provided to the comparator.

What is also desirable is a method by which to make equality comparisons when any or all of the numbers to be compared are in redundant form.

FIG. 22a again shows all of the valid 3-digit representations using a redundant form with a carry bit and a sum bit for each binary digit of the number zero. Displayed next to each representation is a Boolean expression with the variables replaced by the binary values corresponding to a particular redundant representation of zero. The Boolean operations are evaluated to illustrate the purpose of the expression, the central most value corresponding to a comparison to a zero digit. Thus the expression is evaluated at line 2200 to illustrate $XOR(S_2, C_1)=0$, $OR(S_1, C_0)=0$, and $XOR(XOR(S_2, C_1), OR(S_1, C_0))=0$ for the corresponding representation of zero having $S_2$, $C_1$, $S_1$, and $C_0$ equal to 0,0,0, and 0 respectively. Likewise, the expression is evaluated at line 2201 to illustrate $XOR(S_2, C_1)=1$, $OR(S_1, C_0)=1$, and $XOR(XOR(S_2, C_1), OR(S_1, C_0))=0$ for the corresponding representation of zero having $S_2$, $C_1$, $S_1$, and $C_0$ equal to 1,0,1, and 1 respectively. At each line, 2200, 2201, 2202, 2203, and then again at lines 2204, 2205, 2206 and 2207 the expression is evaluated for a different possible internal digit of the redundant representation of zero. The central values in the table at each line show that for the redundant representations of zero, every valid internal digit representation evaluates to zero under the Boolean expression presented. Thus the Boolean expression provides a method to check a redundant representation for equality to zero by checking each bit. More importantly, the expression is not recursive, and therefore does not require carry propagation.

Figures 22A, 22B:
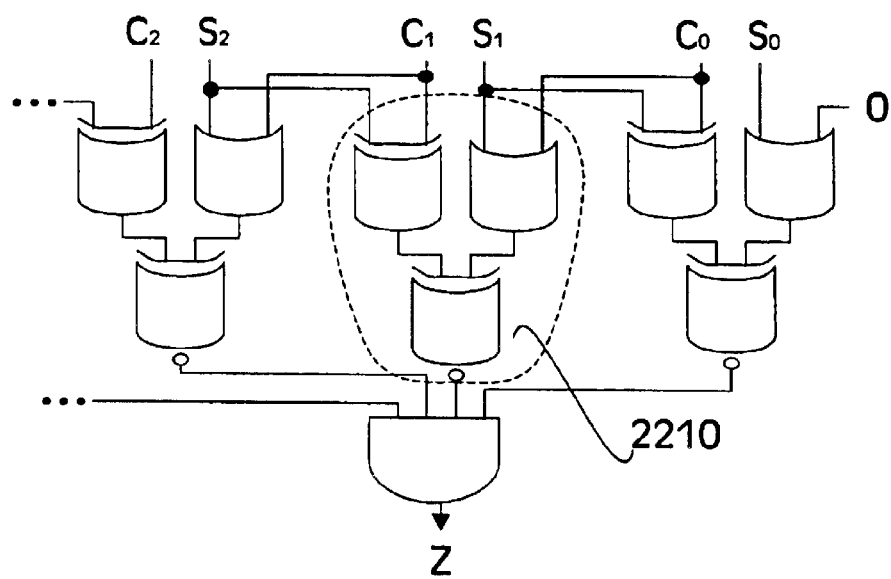
FIG. 22a shows all of the valid 3-digit representations using a redundant form with a carry bit and a sum bit for each binary digit of the number zero and next to each representation a Boolean expression is evaluated, the central most value corresponding to a comparison to a zero digit.
FIG. 22b shows one embodiment of a non-propagative circuit for comparing a number to zero, the number represented in a redundant form with a carry bit and a sum bit for each binary digit.

The expression of FIG. 22a is realized in the circuit of FIG. 22b. One embodiment of a non-propagative circuit for comparing a number to zero uses the circuit 2210 to implement the Boolean expression of FIG. 22a for a number represented in a redundant form with a carry bit and a sum bit for each binary digit. The output at each digit is negated and the results are ANDed together to indicate equality with zero by a corresponding TRUE (1) value. The circuit shown provides the capability of determining equality or inequality before identification of the number's sign, or propagation of carry signals to the number's most significant position can be completed.

Referring for a moment to FIG. 9b, it should be clear that the Boolean expression shown in FIG. 22a can also be used to recognize redundant representations of −3 since a redundant representation for −3 is a bitwise negation of a redundant representation for zero. Therefore the circuit of FIG. 22b, with modifications to support recognizing −3 could also be used to determine equality comparisons if a result produced by subtraction was not augmented according to the method previously disclosed but produced by adding a complemented redundant form of a number without a correction value. More generally, selecting a correction value other than 3 (2 or even 0 for example) to produce a redundant form result having an expected value in cases of equality, that value being something other than zero (−1 or −3 respectively in these examples) and also using a non-propagative circuit to compare the result to the expected value does not depart from the principles of the present invention.

Figure 22C:
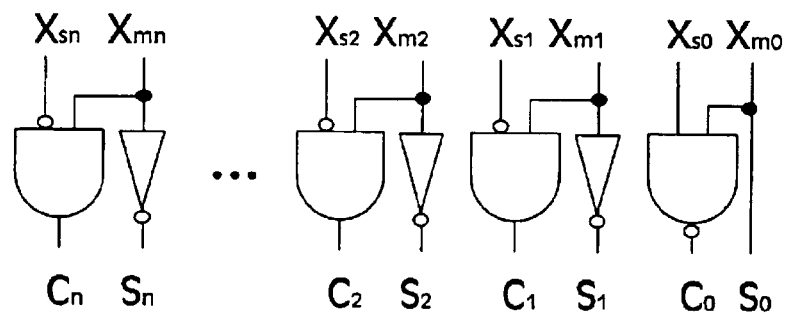
FIG. 22c shows one possible circuit for converting a number from a redundant form with a sign bit and a magnitude bit for each binary digit of the number to a redundant form with a carry bit and a sum bit for each binary digit of the number.

FIG. 22c shows a circuit for converting a number from a redundant form with a sign bit and a magnitude bit for each binary digit of the number to a redundant form with a carry bit and a sum bit for each binary digit of the number. Thus performing such a transformation, permits the circuit of FIG. 22b to be used to check signed-digit numbers for equality to zero.

Figure 22D:
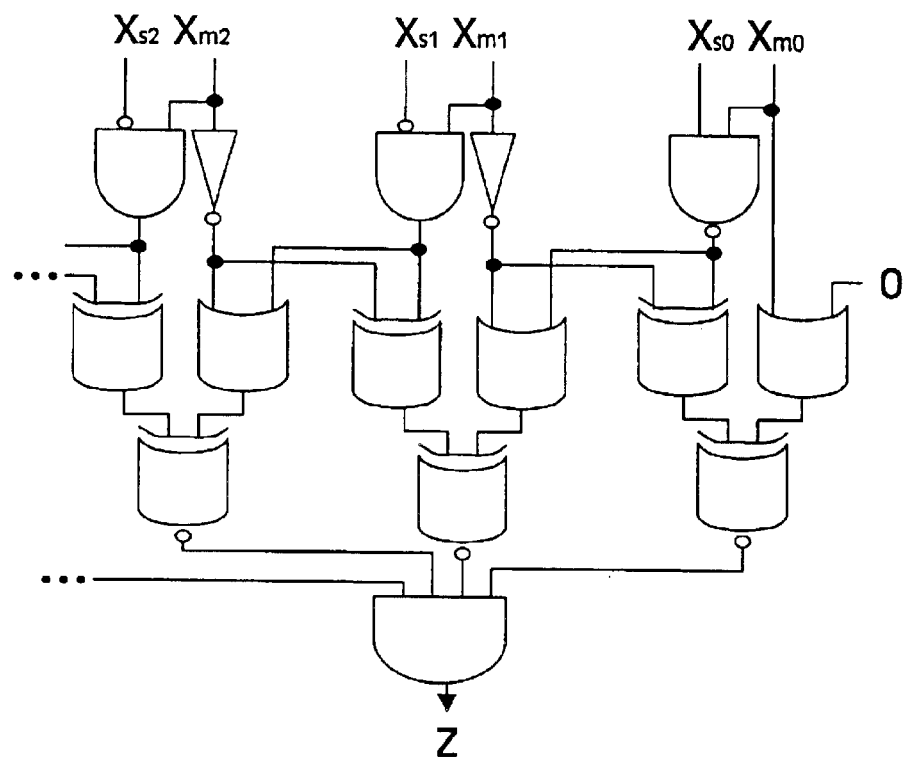
FIG. 22d shows another embodiment of a non-propagative circuit for comparing a number to zero, this number represented in a redundant form with a sign bit and a magnitude bit for each binary digit.
Figure 23:
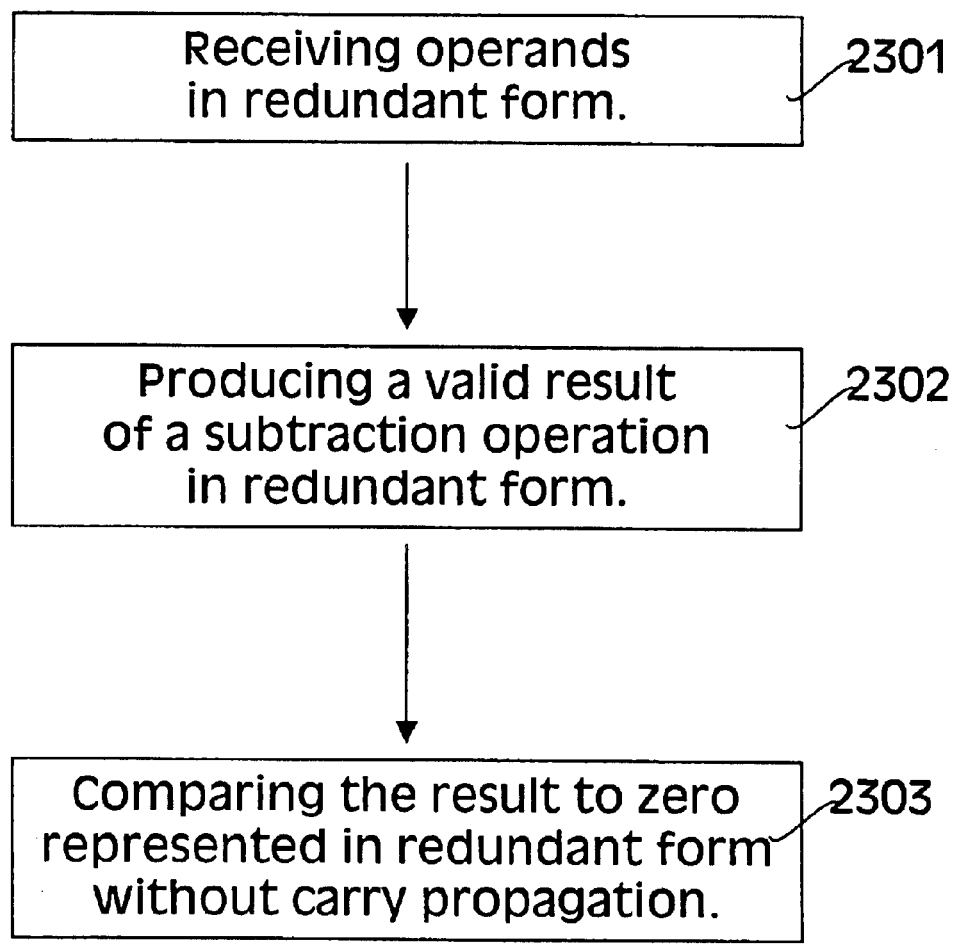
FIG. 23 diagrams a process for performing an equality comparison on operands received in redundant form without carry propagation for any of the operations.

FIG. 22d shows another embodiment of a non-propagative circuit for comparing a number to zero, this number represented in a redundant form with a sign bit and a magnitude bit for each binary digit. Thus the circuit can be adapted to use with signed-digit adders producing results in a signed-digit redundant form. It should be apparent that the circuit can be modified in arrangement and detail by those skilled in the art without departing from the principles of the present invention FIG. 23 diagrams a process for performing an equality comparison on operands received in redundant form without carry propagation for any of the operations. The process comprises receiving operands in redundant form processing block 2301, producing a valid result of a subtraction operation in redundant form in processing block 2302, and comparing the result to zero represented in redundant form without carry propagation in processing block 2303.

Figure 24:
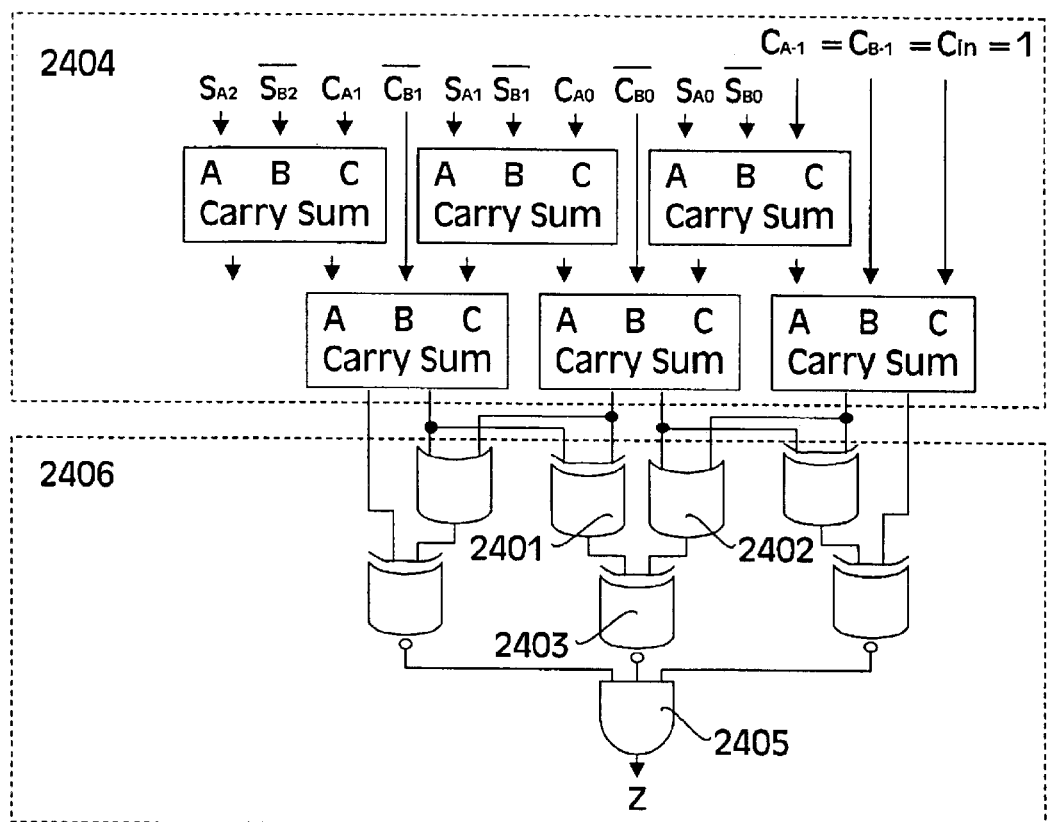
FIG. 24 shows one embodiment of an equality comparison with a redundant adder being used to perform subtraction on operands received in redundant form and a circuit for comparing the result to zero in redundant form without requiring carry propagation.

FIG. 24 shows one embodiment of an equality comparison with a redundant adder, 2404, being used to perform subtraction on operands received in redundant form and a circuit, 2406, for comparing the result to zero in redundant form without requiring carry propagation. The circuit, 2406, is made up of smaller circuits, one for checking each digit of a redundant result. The internal smaller circuits correspond to the function described by the Boolean expression of FIG. 22a. For example, at digit one of the redundant result, the expression is realized by gate 2401, which performs $XOR(S_2, C_1)$; gate 2402, which performs $OR(S_1, C_0)$; and gate 2403 which performs $XNOR(XOR(S_2, C_1), OR(S_1, C_0))$ thereby evaluating the expression as shown in FIG. 22a and also negating the result to be ANDed together with results from other digits by gate 2405.

Figure 25A:
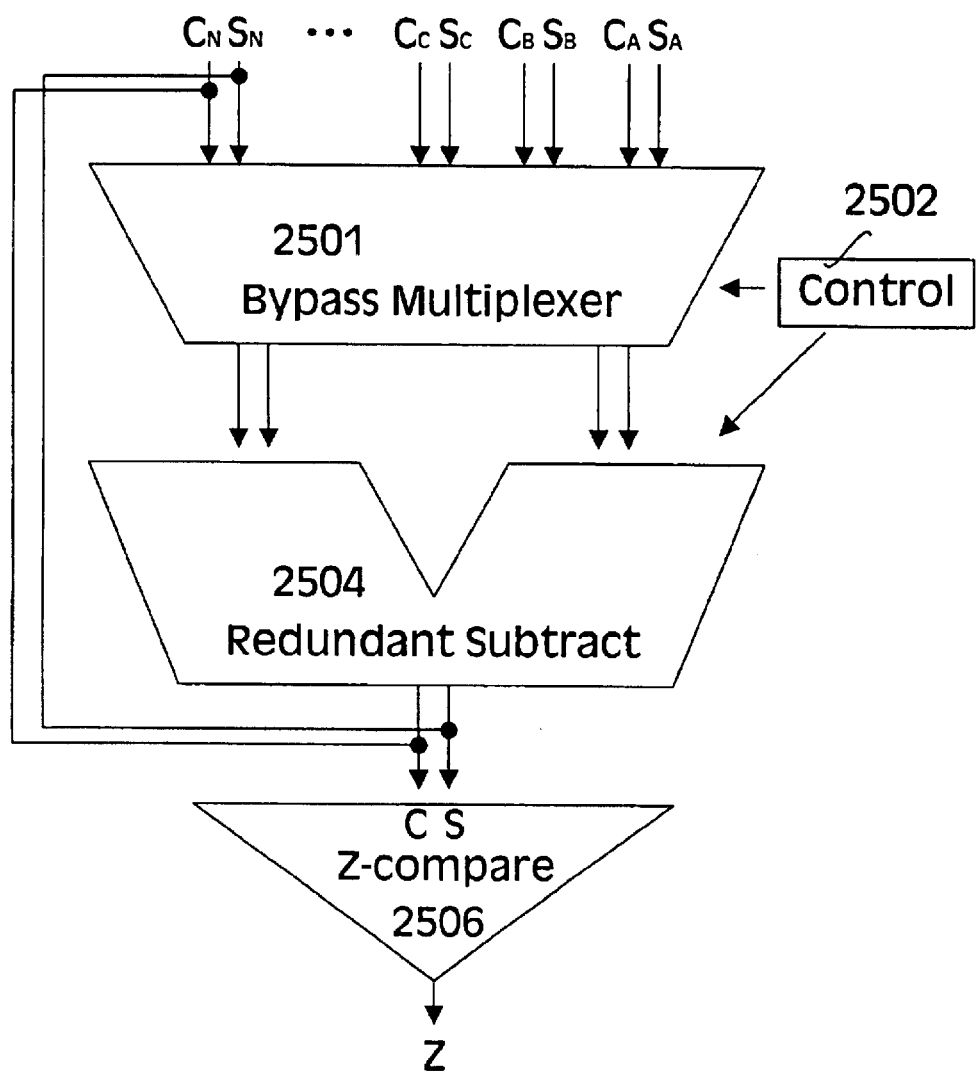
FIG. 25a shows another embodiment of an equality comparison with a redundant adder being used to perform subtraction on operands received in a redundant form with a carry bit and a sum bit for each binary digit, the operands possibly being bypassed from similar or dissimilar circuits, and with a circuit for comparing the result to zero in redundant form without requiring carry propagation.

FIG. 25a shows another embodiment of an equality comparison with a redundant adder, 2504, being used to perform subtraction on operands received in a redundant form with a carry bit and a sum bit for each binary digit. The operands can be bypassed from similar or dissimilar circuits through bypass multiplexer 2501. Control unit 2502 can provide signals to cause a complemented form of at least one operand to be generated and an adjustment value to be added together with the operands to produce a valid result in redundant form of a subtraction operation. A circuit 2506 is provided for comparing the result to zero in redundant form without requiring carry propagation.

Figure 25B:
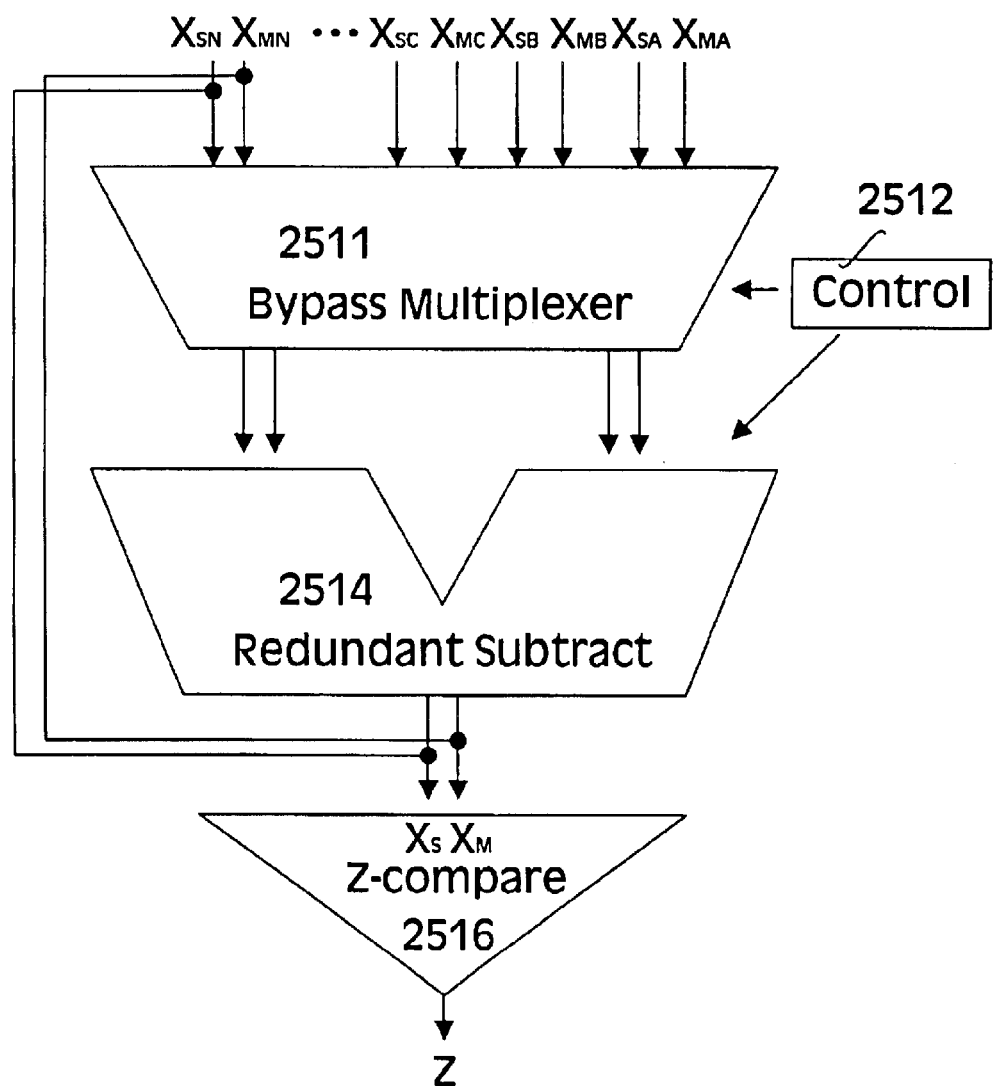
FIG. 25b shows another embodiment of an equality comparison with a redundant adder being used to perform subtraction on operands received in a redundant form with a sign bit and a magnitude bit for each binary digit, the operands possibly being bypassed from similar or dissimilar circuits, and with a circuit for comparing the result to zero in redundant form without requiring carry propagation.

FIG. 25b shows a third embodiment of an equality comparison with a redundant adder, 2514, being used to perform subtraction on operands received in a redundant form with a sign bit and a magnitude bit for each binary digit. The operands are possibly bypassed from similar or dissimilar circuits through bypass multiplexer, 2511. Control unit 2512 can provide signals to effect a subtraction either by causing a complemented form of at least one operand to be generated and an adjustment value to be added together with the operands to produce a valid result in redundant form of a subtraction operation, or by causing sign-bits to be complemented without causing an adjustment value to be added, or by some other means. A circuit, 2516, is provided according to the methods disclosed for comparing the result to zero in redundant form without requiring carry propagation.

Figure 26:
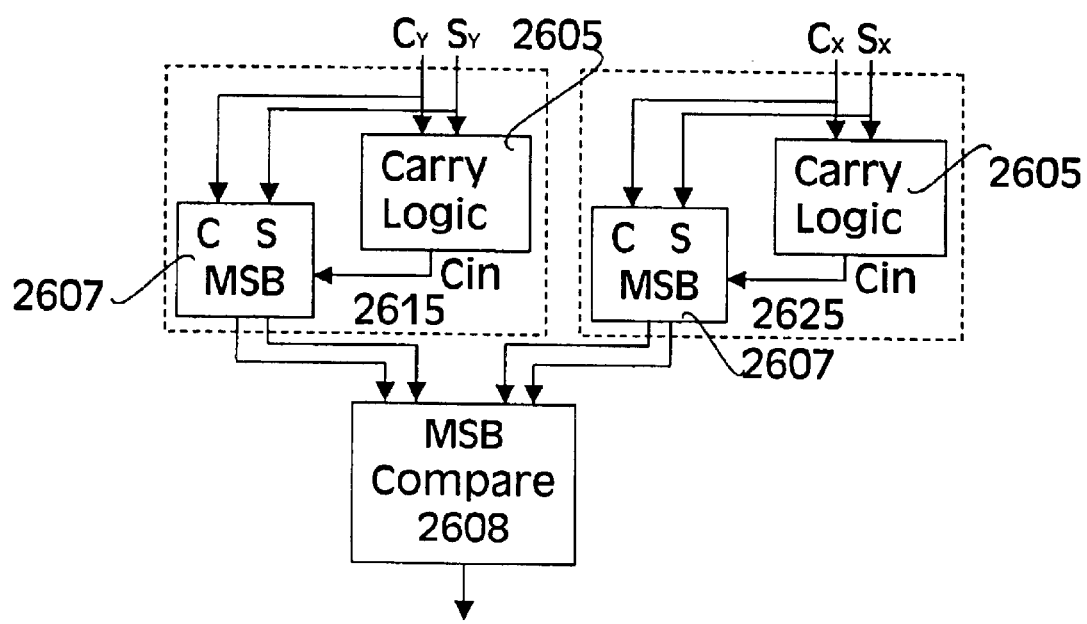
FIG. 26 shows one embodiment of comparison logic to compare the most significant binary digits for equality from numbers represented in a redundant form, using carry logic to produce a carry-in for the most significant binary digit of each number and conversion logic to produce a most significant binary digit for each number.

FIG. 26 shows one embodiment of comparison logic 2608 to compare the most significant binary digits (MSBs) for equality from numbers, X and Y, represented in a redundant form with a carry bit and a sum bit for each binary digit. Carry logic 2605 produces a carry-in signal (Cin) for the most significant binary digit of each number. Conversion logic 2607 receives the carry-in signal along with the most significant carry bit and sum bit for each number and produces a most significant binary digit for each number. In one preferred embodiment, both high-active and low-active signals are produced by conversion logic 2607 as MSB inputs for comparison logic 2608.

Figure 27A:
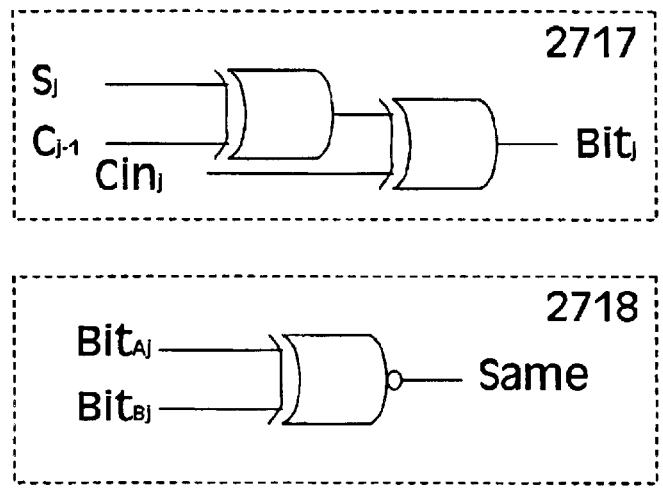
FIG. 27a shows one embodiment of conversion logic to produce a binary digit of a number represented in the two's complement representation method from a number represented in a redundant form with a carry bit and a sum bit for each binary digit, and comparison logic to compare two binary digits for equality.

FIG. 27a shows one embodiment of conversion logic 2717 to receive a carry-in signal $Cin_j$ along with the most significant carry bit, $C_{j-1}$, and sum bit, $S_j$, for a number and to produce a binary digit, $Bit_j$, of a number represented in the two's complement representation method. FIG. 27a further shows comparison logic 2718 to receive two binary digits, $Bit_{Aj}$ and $Bit_{Bj}$, of A and B represented in the two's complement representation method and to compare the two binary digits, $Bit_{Aj}$ and $Bit_{Bj}$, for equality, producing a Same signal if the two binary digits are equal.

Figure 27B:
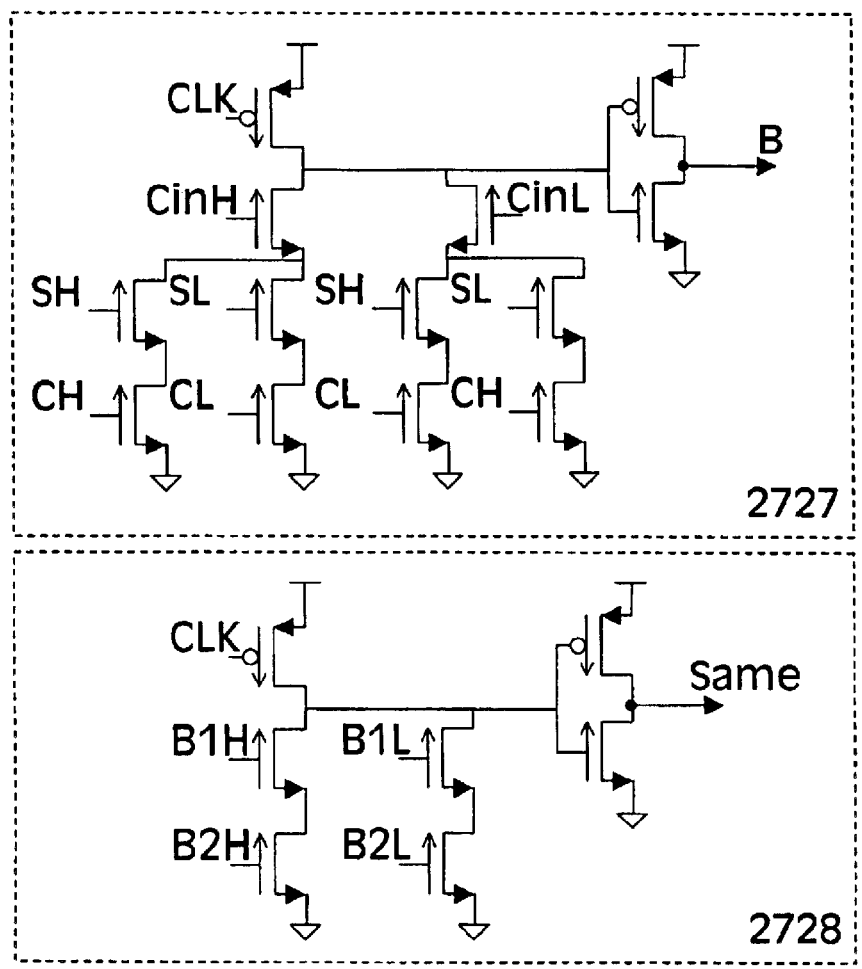
FIG. 27b shows an alternative embodiment of conversion logic to produce a binary digit of a number represented in the two's complement representation method from a number represented in a redundant form with a carry bit and a sum bit for each binary digit, and comparison logic to compare two binary digits for equality.

FIG. 27b shows an alternative embodiment of conversion logic 2727 to receive a carry-in signal, high-active CinH and low-active CinL, along with the most significant carry bit, high-active CH and low-active CL, and the most significant sum bit, high-active SH and low-active SL, for a number and to produce a binary digit, B, of the number represented in the two's complement. FIG. 27b further shows comparison logic 2728 to receive two binary digits, high-active B1H and low-active B1L of binary digit B1 and high-active B2H and low-active B2L of binary digit B2, of a number represented in the two's complement representation method and to compare the two binary digits, B1 and B2, for equality, producing a Same signal if the two binary digits are equal.

Figure 28A:
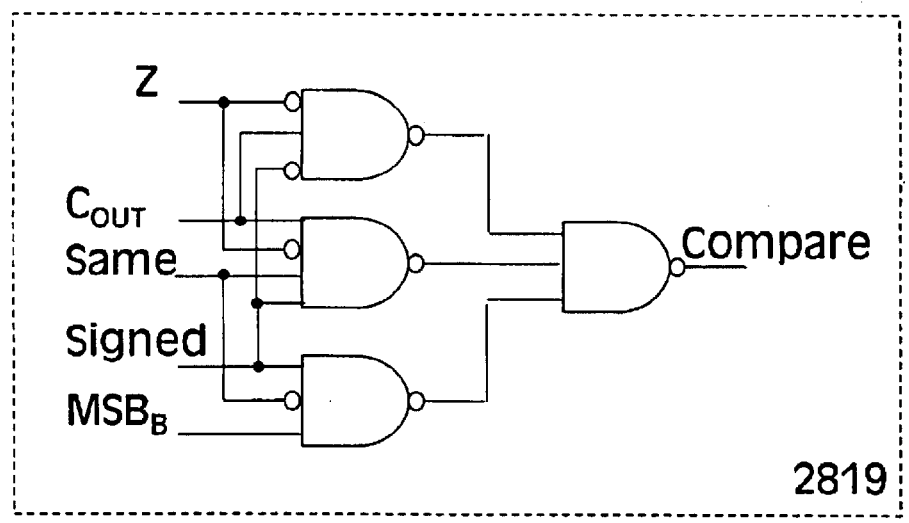
FIG. 28a shows one embodiment of magnitude comparison logic to produce the result of a magnitude comparison for two numbers represented in a redundant form.

FIG. 28a shows one embodiment of magnitude comparison logic 2819 to produce a Compare signal as the result of a magnitude comparison for two numbers, A and B, represented in a redundant form. If magnitude comparison logic 2819 receives a negated Z signal, indicating that A≠B, and an asserted Cout signal, then the Compare signal is asserted when an unsigned comparison is performed in accordance with receiving a negated Signed signal. On the other hand, if an asserted Same signal, indicating that the most significant bits of A and B are equal, is also received by magnitude comparison logic 2819, then the Compare signal is asserted when a signed comparison is performed in accordance with receiving an asserted Signed signal. Finally, if the most significant bit of B is a logic value of 1 and if a negated Same signal, indicating that the most significant bits of A and B are not equal, is received by magnitude comparison logic 2819, then the Compare signal is asserted when a signed comparison is performed in accordance with receiving an asserted Signed signal.

It will be appreciated that the Compare signal of FIG. 28a indicates the truth (when Compare has a logic value of 1) of a magnitude comparison operation, A>B. It will also be appreciated that a magnitude comparison operation, A<B, may be facilitated through an inversion of the Cout signal and a substitution of the most significant bit of A as inputs to comparison logic 2819. It will further be appreciated that the Compare signal may be inverted to indicate, for example, when A is not greater than B (B≧A) or when A is not less than B (A≧B).

Figure 28B:
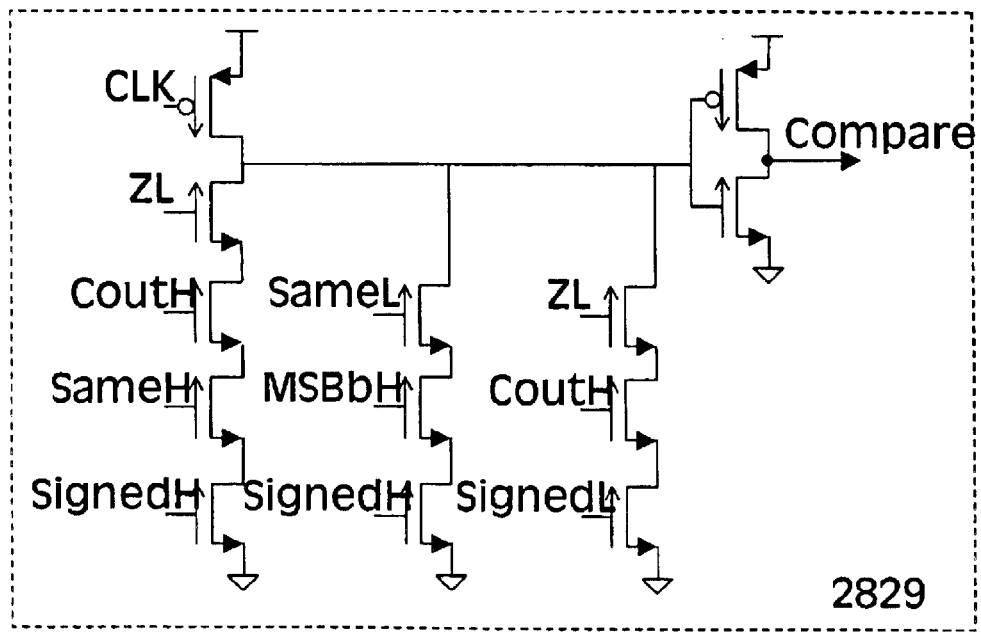
FIG. 28b shows an alternative embodiment of magnitude comparison logic to produce the result of a magnitude comparison for two numbers represented in a redundant form.

FIG. 28b shows an alternative embodiment of magnitude comparison logic 2829 to produce a Compare signal as the result of a magnitude comparison for two numbers, A and B, represented in a redundant form. If magnitude comparison logic 2829 receives a high ZL signal, indicating that A≠B, and a high Cout signal, then the Compare signal is asserted high when an unsigned comparison is performed in accordance with receiving a high SignedL signal. On the other hand, if a high SameH signal, indicating that the most significant bits of A and B are equal, is also received by magnitude comparison logic 2819, then the Compare signal is asserted high when a signed comparison is performed in accordance with receiving a high SignedH signal. Finally, if a high MSBbH signal is received, indicating that the most significant bit of B is a logic value of 1 and if a high SameL signal is received, indicating that the most significant bits of A and B are not equal, then the Compare signal is asserted high when a signed comparison is performed in accordance with receiving a high SignedH signal.

Figure 29:
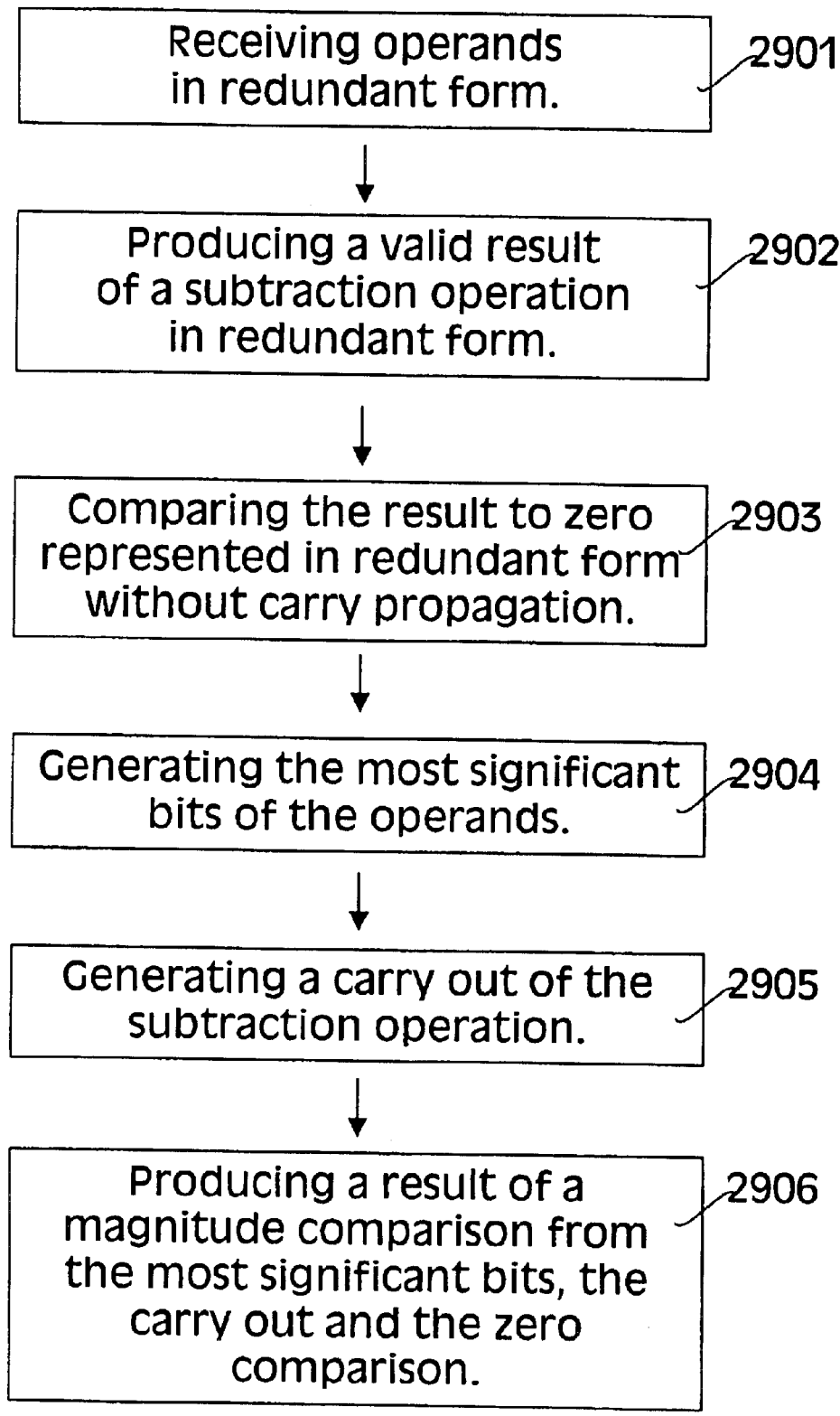
FIG. 29 diagrams a process for performing a fast magnitude comparison on operands received in redundant form.

FIG. 29 diagrams a process for performing a fast magnitude comparison on operands received in redundant form. The process comprises receiving operands in redundant form in processing block 2901; producing a valid result of a subtraction operation in redundant form in processing block 2902; comparing the result to zero represented in redundant form without carry propagation in processing block 2903; generating the most significant bits of the operands in processing block 2904; generating a carry out of the subtraction operation in processing block 2905; and producing, in processing block 2906, a result of a magnitude comparison from the most significant bits, the carry out and the zero comparison.

Figure 30A:
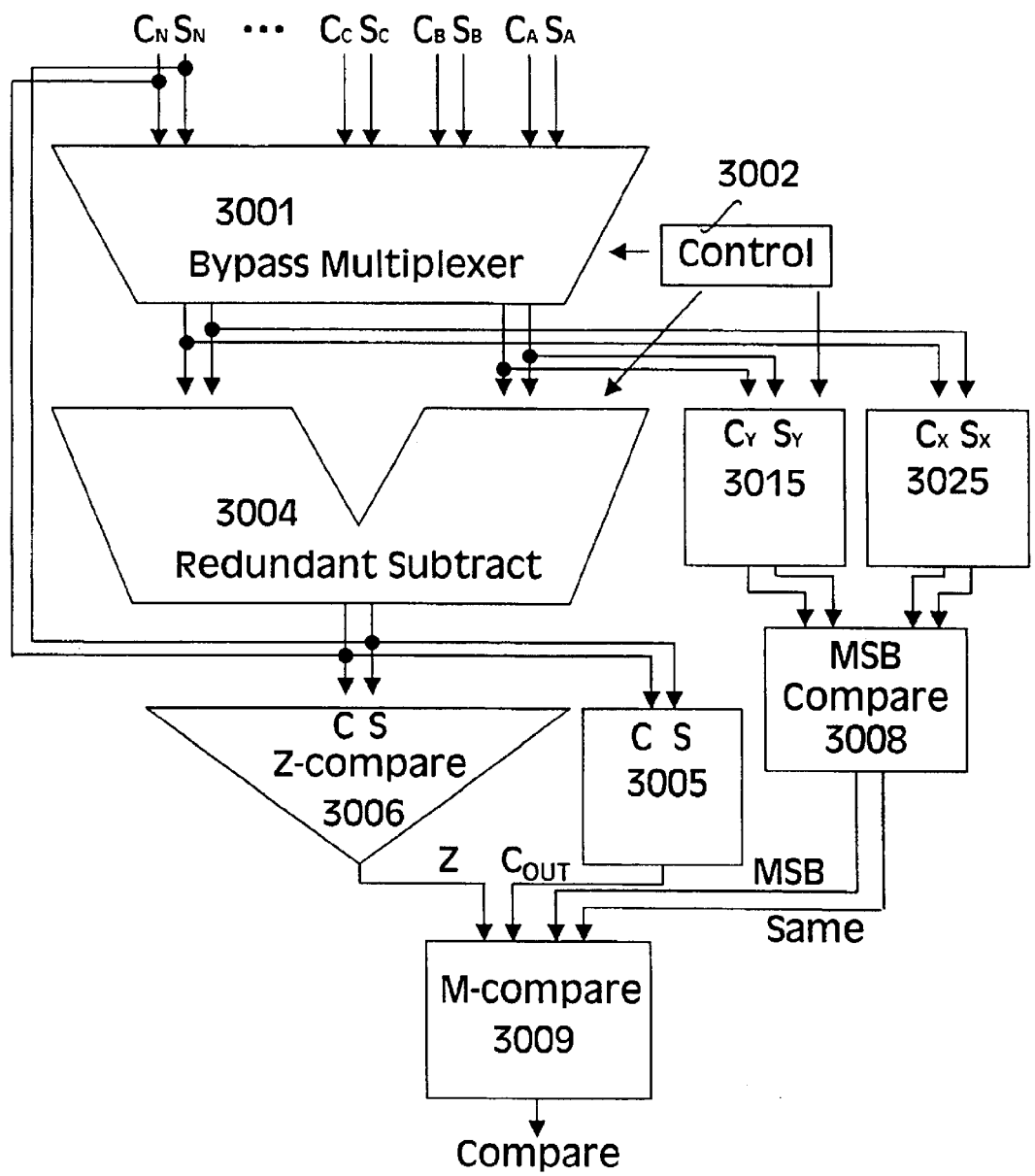
FIG. 30a shows one embodiment of a fast magnitude comparison of two of N operands received in a carry-sum redundant form.

FIG. 30a shows one embodiment of a fast magnitude comparison of two of N operands received in a carry-sum redundant form by bypass multiplexer 3001. The operands are possibly bypassed from similar or dissimilar circuits through bypass multiplexer 3001. Control unit 3002 can cause a complemented form of at least one operand to be generated in redundant form and an adjustment value to be added together with the operands to cause redundant subtract logic 3004 to produce a valid result of a subtraction operation in redundant form. Z-comparison logic 2606 is provided in accordance with the methods disclosed for comparing the result to zero in redundant form without requiring carry propagation. Carry logic 3005 is also provided for generating a carry out signal, Cout.

MSB comparison logic 3008 compares the most significant binary digits of the two operands for equality. Carry/conversion logic 3025 propagates a carry signal and produces the most significant binary digit of a first operand. It will be appreciated that a most significant binary digit may be produced either from an uncomplemented or from a complemented operand. If it is convenient, carry and conversion logic 3015, for example, may propagate a carry signal and produce the most significant binary digit of a second operand from a complemented operand. Control unit 3002 can cause a second adjustment value to be used together with the operand to cause carry and conversion logic 3015 to produce a complement of the most significant binary digit for the second operand. In one preferred embodiment, both high-active and low-active signals are produced as MSB inputs for comparison logic 3008, so both complemented and uncomplemented MSB inputs are readily available.

Magnitude comparison logic 3009 produces a Compare signal as the result of a magnitude comparison for the two operands. If magnitude comparison logic 3009 receives a negated Z signal from Z-comparison logic 3006, indicating that A≠B, and receives an asserted Cout signal from carry logic 3005, then the Compare signal is asserted when an unsigned comparison is performed. On the other hand, if an asserted Same signal from MSB comparison logic 3008 is also received by magnitude comparison logic 3009, indicating that the most significant bits of A and B are equal, then the Compare signal is asserted when a signed comparison is performed. Finally, if the most significant bit of the first operand is a logic value of 1 and if a negated Same signal from MSB comparison logic 3008 is received by magnitude comparison logic 3009, indicating that the most significant bits of A and B are not equal, then the Compare signal is asserted when a signed comparison is performed.

Figure 30B:
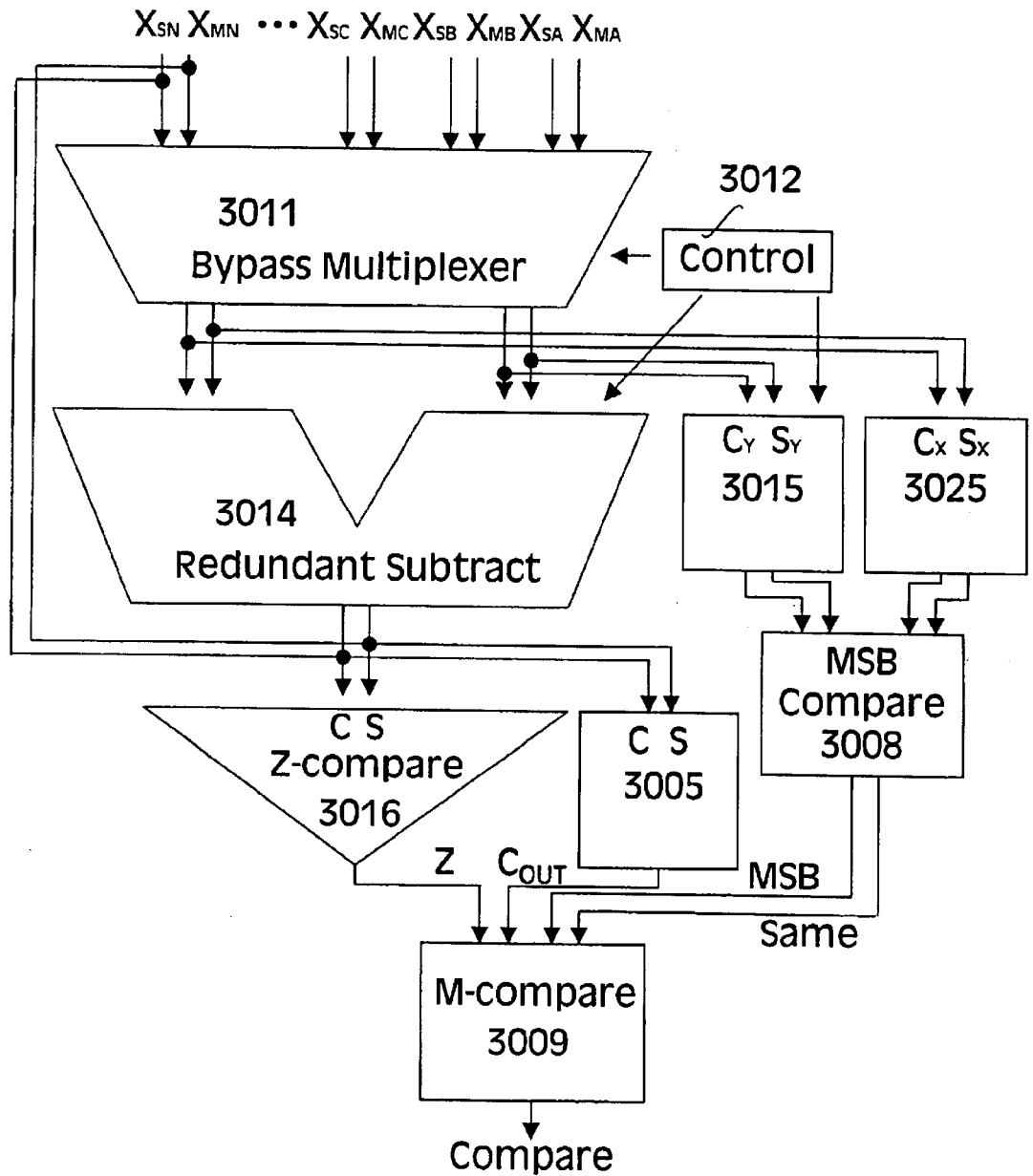
FIG. 30b shows one embodiment of a fast magnitude comparison of two of N operands received in a signed-digit redundant form.

FIG. 30b shows one embodiment of a fast magnitude comparison of A and B operands received in a signed-digit redundant form by bypass multiplexer 3011. The operands are possibly bypassed from similar or dissimilar circuits through bypass multiplexer 3011. Control unit 3012 can cause a complemented form of at least one operand to be generated in redundant form and an adjustment value to be added together with the operands to cause redundant subtract logic 3014 to produce a valid result of a subtraction operation in redundant form. Z-comparison logic 3016 is provided in accordance with the methods disclosed for comparing the result to zero in redundant form without requiring carry propagation. Carry logic 3005 is also provided for generating a carry out signal, Cout.

MSB comparison logic 3008 compares the most significant binary digits of the two operands for equality. Carry/conversion logic 3025 produces both a complemented and an uncomplemented MSB of a first operand. If it is convenient, control unit 3012 may cause a second adjustment value to be used together with a second operand to cause carry/conversion logic 3015 to produce both a complemented and an uncomplemented MSB for the second operand. Magnitude comparison logic 3009 produces a Compare signal as the result of a magnitude comparison for the two operands.

Thus what has most recently been disclosed enables performing, at very high computation rates, efficient bypassing of operands in redundant form for operations including addition, subtraction, and comparisons of redundant arithmetic results where any or all of the operands are received in redundant form.

Figure 31:
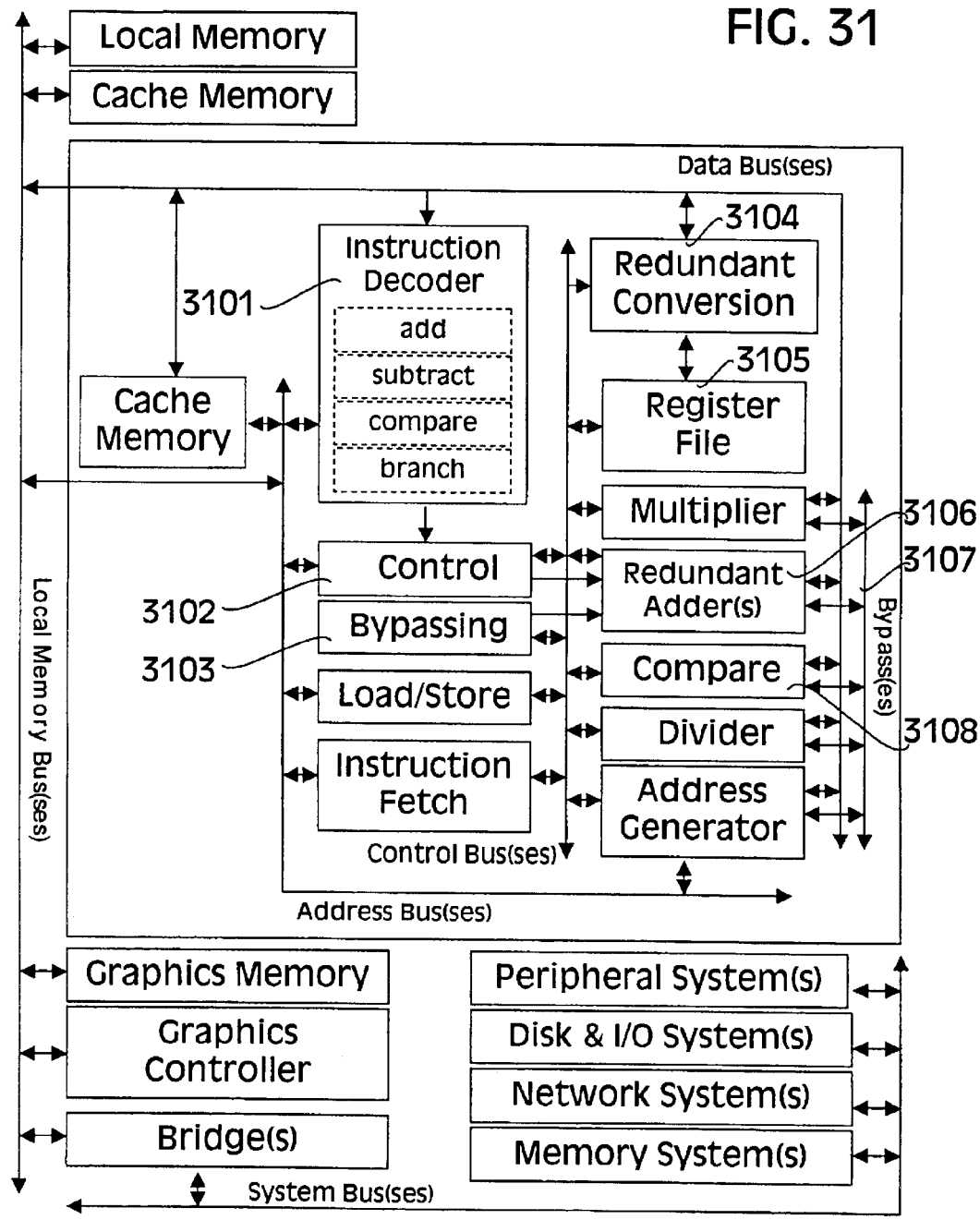
FIG. 31 shows one embodiment of a digital system comprising bypass circuitry, redundant arithmetic circuitry and comparison circuitry adapted to perform additions, subtractions and magnitude comparisons in accordance with the methods and teachings of the present invention.

FIG. 31 shows one embodiment of a digital computing system. The instruction decoder, 3101, is capable of decoding instructions including but not limited to addition instructions, subtraction instructions, compare instructions and branch instructions. Many of the digital functions may be implemented with redundant form arithmetic circuitry including but not limited to multiplication, division, address generation, comparisons, addition and subtraction. In particular redundant adder, 3106, uses redundant form circuitry to perform subtraction in the manner previously disclosed. When an instruction completes, the results are converted from redundant form through redundant conversion unit, 3104, and written into register file, 3105. If a subtraction or comparison instruction requires, as an operand, a result from a previous instruction, the result may be bypassed in redundant form via bypass(es), 3107, under the direction of bypass routing control, 3103. The result may be supplied by any of the functional units that use redundant form representations. Control, 3102, directs the negation of the bypassed operand through complementing its digits and augmenting the result with a correction value supplied as input to redundant adder, 3106. Thus, results may be bypassed as operands in redundant form and valid results may be produced in redundant form for subtraction operations. The magnitudes of results produced by redundant arithmetic circuitry and transmitted in redundant form may be compared by magnitude comparison logic 3108.

The above description is intended to illustrate preferred embodiments of the present invention. From the discussion above it should also be apparent that the invention can be modified in arrangement and detail by those skilled in the art without departing from the principles of the present invention within the scope of the accompanying claims.

What is claimed is:

1. An apparatus for comparing numbers comprising:
   a redundant arithmetic circuit having a capacity to receive a plurality of comparison operands, each comparison operand representing a value of a first set of values, the redundant arithmetic circuit further having a capacity to receive a first operand of the plurality of comparison operands in a first redundant form; and
   comparison logic coupled with the redundant arithmetic circuit to generate a comparison result with respect to the first operand represented in the first redundant form and at least one other operand of the plurality of comparison operands.

2. The apparatus reeked in claim 1 wherein each value of the first set of values is representable by said first operand and wherein each value of the first set of values is representable by said at least one other operand.

3. The apparatus recited in claim 1 wherein the comparison logic generates the comparison result indicating the comparison is true when the first operand is greater than the at least one other operand of the plurality of comparison operands.

4. The apparatus recited in claim 1 wherein the comparison logic generates the comparison result indicating the comparison is true when the first operand is less than the at least one other operand of the plurality of comparison operands.

5. The apparatus recited in claim 1 wherein the comparison logic generates the comparison result indicating the comparison is true when the first operand is not less than the at least one other operand of the plurality of comparison operands.

6. The apparatus recited in claim 1 wherein the redundant arithmetic circuit is to perform a subtraction operation on the plurality of comparison operands and to generate a valid first result of a subtraction operation, the first result represented in a second redundant form.

7. The apparatus recited in claim 6 further comprising:
   conversion logic to produce a most significant binary digit (MSB) of the first operand represented in the first redundant form.

8. The apparatus recited in claim 7 wherein the comparison logic comprises Z-comparison logic to compare the first result to a zero represented in the second redundant form and to generate a zero result indicating that the first result is equal to zero.

9. The apparatus recited in claim 8 wherein the comparison logic generates the comparison result indicating the comparison is true responsive to the MSB and the zero result.

10. The apparatus recited in claim 8 wherein the comparison logic generates the comparison result indicating the comparison is true when the first operand is equal to the at least one other operand of the plurality of comparison operands.

11. The apparatus recited in claim 10 wherein the first operand of the plurality of comparison operands is represented by 2n bits in the first redundant form.

12. The apparatus recited in claim 1 wherein the first set of values is a set of $2^n$ distinct values, each value corresponding to a distinct n-bit binary representation.

13. The apparatus recited in claim 12 wherein the first set of values is selected from the group consisting of: the set $[-2^{n-1}, 2^{n-1}-I]$ corresponding to signed n-bit two's complement representations, and the set $[0, 2^n-I]$ corresponding to unsigned n-bit representations.

14. An apparatus for comparing numbers comprising:
an interface to receive a plurality of operands of a first set of representable values wherein the interface has the capacity to receive a first operand of the plurality of operands in a first redundant form;
a redundant arithmetic circuit to perform a subtraction operation on the plurality of operands, said arithmetic circuit to generate a valid first result of a subtraction operation, the first result represented in a second redundant form;
conversion logic coupled with the interface to produce a most significant bit of a two's complement representation from the first redundant form of the first operand;
comparison logic coupled with the arithmetic circuit and the conversion logic to generate a second result indicating the truth of a magnitude comparison operation of the first operand represented in the first redundant form with at least one other operand of the plurality of operands.

15. The apparatus recited in claim 14 wherein each of the plurality of operands can represent any value of the first set of representable values.

16. The apparatus recited in claim 14 wherein said comparison logic generates the second result indicating the truth of a magnitude comparison operation when the first operand is greater than the at least one other operand of the plurality of operands.

17. The apparatus recited in claim 14 wherein said apparatus further comprises: Z-comparison logic coupled with the redundant arithmetic circuit to compare the first result to a zero represented in the second redundant form and to produce a zero result indicating that the first result is equal to zero.

18. The apparatus recited in claim 17 wherein the comparison logic generates the second result indicating the truth of the magnitude comparison responsive to the most significant bit produced by the conversion logic and the zero result produced by the Z-comparison logic.

19. The apparatus recited in claim 18 wherein the comparison logic generates the second result indicating the magnitude comparison is true when the first operand is less than the at least one other operand of the plurality of operands.

20. A method comprising:
receiving a plurality of operands, an operand of said plurality of operands in a first redundant form;
subtracting the operand from at least one of said plurality of operands and producing a first result in a second redundant form;
generating a zero indicator by comparing the first result to zero represented in the second redundant form;
generating a most significant binary digit (MSB) from the first redundant form of the operand; and
producing a second result of a magnitude comparison responsive to the MSB and the zero indicator.

21. The method recited in claim 20 further comprising:
generating a carry-out of the subtraction operation; and
producing the second result of the magnitude comparison responsive to the most significant bit, the carry out and the zero indicator.

22. An article of manufacture comprising:
a machine accessible medium including data that when accessed by a machine causes the machine to
receive a plurality of operands, an operand of said plurality of operands in a first redundant form,
subtract the operand in the first redundant form from at least one of said plurality of operands to produce a first result in a second redundant form, and
produce a second result of a magnitude comparison responsive to the first result in a second redundant form.

23. The article of manufacture recited in claim 22 wherein the machine accessible medium including data that when accessed by a machine further causes the machine to
generate a zero indicator by comparing the first result to zero represented in the second redundant form,
generate a most significant bit from the first redundant form of the operand,
generate a carry-out of the subtraction operation, and
produce the second result of the magnitude comparison responsive to the most significant bit, the carry out and the zero indicator.

24. An apparatus comprising:
a first switching device having a first activation input, the first switching device coupled with a first voltage terminal and a first charge accumulation node to conduct a current between the first voltage terminal and the charge accumulation node responsive to a second voltage level being applied to the first activation input;
a first discharge circuit having a first interface to receive a first plurality of signals comprising a not-zero signal, a carry-out signal, a same signal, and a signed signal, the first discharge circuit coupled with a second voltage terminal and the first charge accumulation node to conduct a current between the second voltage terminal and the charge accumulation node responsive to the not-zero signal, the carry-out signal, the same signal, and the signed signal;
a second discharge circuit having a second interface to receive a second plurality of signals comprising a not-same signal, a MSB signal, and the signed signal, the second discharge circuit coupled with the second voltage terminal and the first charge accumulation node to conduct a current between the second voltage terminal and the charge accumulation node responsive to the not-same signal, the MSB signal, and the signed signal; and
a third discharge circuit having a third interface to receive a third plurality of signals comprising the not-zero signal, the carry-out signal, and a not-signed signal, the third discharge circuit coupled with the second voltage terminal and the first charge accumulation node to conduct a current between the second voltage terminal and the charge accumulation node responsive to the not-zero signal, the carry-out signal, and a not-signed signal.

25. An apparatus comprising:
a first comparison logic to receive a number represented in a redundant form having a plurality of digits ranked sequentially according to significance, the comparison logic comprising a plurality of digit comparison circuits each digit comparison circuit to receive signals from at most three digits of the plurality of digits and generate a digit-indication of whether a middle ranking digit of the at most three digits is zero, the comparison logic further to combine the digit-indications generated by the plurality of digit comparison circuits to generate a zero-indication of whether the number represented in redundant form is zero.

26. The apparatus recited in claim 25 further comprising:
a first carry logic to propagate a carry signal from the plurality of digits ranked sequentially according to significance to generate a carry-out.

27. The apparatus recited in claim 26 further comprising:
a second comparison logic to combine the zero-indication generated by the first comparison logic with the carry-out generated by the first carry logic to generate a magnitude-indication of whether the number represented in redundant form is in a relation to zero selected from the group consisting of less-than zero, greater-than zero, less-than-or-equal to zero, and greater-than-or-equal to zero.

28. The apparatus recited in claim 27 further comprising:
a redundant arithmetic circuit to receive a first comparison operand and a second comparison operand and to generate the number represented in redundant form as a valid result of a subtraction operation between the first comparison operand and the second comparison operand.

29. The apparatus recited in claim 28 further comprising:
a third comparison logic to receive a first most significant binary digit (MSB) corresponding to the first comparison operand and a second MSB corresponding to the second comparison operand, the third comparison logic to generate a same-indication of whether the first MSB and the second MSB are equal, wherein the second comparison logic further combines the same-indication with the zero-indication generated by the first comparison logic and the carry-out generated by the first carry logic to generate the magnitude-indication.

30. The apparatus recited in claim 29 further comprising:
a second carry logic to generate a second carry signal from the second comparison operand; and
a conversion logic to receive the second carry signal and to generate the second MSB.

31. A digital computing system comprising:
an arithmetic device to add a plurality of numbers in redundant form;
bypass circuitry to bypass a result in a redundant form as input to the arithmetic device;
a receiving circuit to receive the result from the bypass circuitry and to generate a complemented redundant form of at least one number supplied to the arithmetic device;
a control unit to direct an adjustment input to the arithmetic device to adjust a result produced by adding to generate an outcome of a subtraction operation represented in a redundant form; and
a magnitude comparison logic coupled with the arithmetic device to generate a comparison result indicating the truth of a magnitude comparison of said at least one number to at least one other number of the plurality of numbers in redundant form.

* * * * *